United States Patent
Wan et al.

(10) Patent No.: US 12,499,586 B2
(45) Date of Patent: Dec. 16, 2025

(54) POINT CLOUD DECODING METHOD, DECODER, AND NON-TRANSITORY COMPUTER-READABLE STORAGE MEDIUM

(71) Applicant: GUANGDONG OPPO MOBILE TELECOMMUNICATIONS CORP., LTD., Dongguan (CN)

(72) Inventors: Shuai Wan, Dongguan (CN); Zhang Chen, Dongguan (CN); Zhecheng Wang, Dongguan (CN); Fuzheng Yang, Dongguan (CN)

(73) Assignee: GUANGDONG OPPO MOBILE TELECOMMUNICATIONS CORP., LTD., Dongguan (CN)

( * ) Notice: Subject to any disclaimer, the term of this patent is extended or adjusted under 35 U.S.C. 154(b) by 322 days.

(21) Appl. No.: 18/228,047

(22) Filed: Jul. 31, 2023

(65) Prior Publication Data
US 2023/0386089 A1    Nov. 30, 2023

Related U.S. Application Data

(63) Continuation of application No. PCT/CN2021/076345, filed on Feb. 9, 2021.

(51) Int. Cl.
*G06K 9/36* (2006.01)
*G06K 9/46* (2006.01)
(Continued)

(52) U.S. Cl.
CPC .......... *G06T 9/001* (2013.01); *H04N 19/124* (2014.11); *H04N 19/147* (2014.11)

(58) Field of Classification Search
None
See application file for complete search history.

(56) References Cited

U.S. PATENT DOCUMENTS

| | | | | |
|---|---|---|---|---|
| 7,023,435 B1 * | 4/2006 | Litke | ............ | G06T 17/205 345/420 |
| 8,502,815 B2 * | 8/2013 | Stefanoski | ............ | G06T 9/001 345/428 |

(Continued)

FOREIGN PATENT DOCUMENTS

| | | |
|---|---|---|
| CN | 110572655 A | 12/2019 |
| CN | 112019842 A | 12/2020 |
| WO | WO-2007105590 A1 * | 9/2007 ........... H04N 19/109 |

OTHER PUBLICATIONS

WO-2007105590-A1 (machine translation) (Year: 2007).*

(Continued)

*Primary Examiner* — Feng Niu
(74) *Attorney, Agent, or Firm* — BAYES PLLC

(57) ABSTRACT

A point cloud decoding method includes that: a decoder decodes a bitstream, and determines a mode parameter; in response to the mode parameter indicating to use a spatial scalability mode, the decoder determines geometric center coordinates of a current node, and determines, in the point cloud, geometric center coordinates of neighbouring nodes of the current node based on the geometric center coordinates of the current node; the decoder determines local spatial coordinate means corresponding to the current node based on the geometric center coordinates of the current node and the geometric center coordinates of the neighbouring nodes; and the decoder determines reconstructed geometric information of the current node based on the local spatial coordinate means. Further, a decoder and a non-transitory computer-readable storage medium are also provided.

20 Claims, 8 Drawing Sheets

(51) Int. Cl.
*G06T 9/00* (2006.01)
*H04N 19/124* (2014.01)
*H04N 19/147* (2014.01)

(56) References Cited

U.S. PATENT DOCUMENTS

| | | | | |
|---|---|---|---|---|
| 8,698,800 | B2* | 4/2014 | Xie | G06T 17/20 |
| | | | | 345/423 |
| 10,284,876 | B2* | 5/2019 | Lee | H04N 19/11 |
| 11,217,016 | B1* | 1/2022 | Mason | G06T 17/20 |
| 11,334,969 | B2* | 5/2022 | Graziosi | H04N 19/96 |
| 11,395,004 | B2* | 7/2022 | Hur | H04N 19/96 |
| 11,483,363 | B2* | 10/2022 | Hur | H04L 65/762 |
| 12,225,241 | B2* | 2/2025 | Wan | H04N 19/1883 |
| 12,307,729 | B2* | 5/2025 | Oh | H04N 19/96 |
| 2003/0206659 | A1* | 11/2003 | Hamanaka | H04N 19/31 |
| | | | | 375/E7.079 |
| 2007/0120850 | A1* | 5/2007 | Xie | G06T 17/20 |
| | | | | 345/423 |
| 2010/0027845 | A1* | 2/2010 | Kim | G06V 40/28 |
| | | | | 382/107 |
| 2012/0262444 | A1* | 10/2012 | Stefanoski | G06T 9/001 |
| | | | | 345/419 |
| 2016/0156932 | A1* | 6/2016 | Lee | H04N 19/159 |
| | | | | 375/240.13 |
| 2020/0380731 | A1 | 12/2020 | Vosoughi | |
| 2021/0006806 | A1* | 1/2021 | Schwarz | H04N 19/82 |
| 2021/0105504 | A1* | 4/2021 | Hur | H04N 19/167 |
| 2021/0166436 | A1* | 6/2021 | Zhang | G06T 9/40 |
| 2021/0209813 | A1* | 7/2021 | Hur | H04N 19/70 |
| 2021/0211722 | A1* | 7/2021 | Hur | H04N 19/70 |
| 2021/0250594 | A1* | 8/2021 | Gao | H04N 19/33 |
| 2022/0230360 | A1* | 7/2022 | Oh | G06T 9/00 |
| 2022/0337884 | A1* | 10/2022 | Wan | H04N 19/96 |
| 2022/0383552 | A1* | 12/2022 | Hur | G06T 9/004 |
| 2023/0101072 | A1* | 3/2023 | Wan | H04N 19/132 |
| | | | | 382/232 |
| 2023/0125529 | A1* | 4/2023 | Watanabe | H04N 19/70 |
| | | | | 382/232 |
| 2023/0186527 | A1* | 6/2023 | Oh | H04N 19/70 |
| | | | | 345/419 |
| 2023/0196625 | A1* | 6/2023 | Li | G06T 9/004 |
| | | | | 382/232 |
| 2023/0316584 | A1* | 10/2023 | Oh | G06T 9/001 |
| | | | | 382/243 |
| 2023/0377207 | A1* | 11/2023 | Wan | H04N 19/13 |
| 2024/0037800 | A1* | 2/2024 | Yuan | G06T 9/004 |

OTHER PUBLICATIONS

Zink et al., "P2P streaming using multiple description coded video," Proceedings. 30th Euromicro Conference, 2004., Rennes, France, 2004, pp. 240-247 (Year: 2004).*

Chen et al., "Geometry Reconstruction for Spatial Scalability in Point Cloud Compression Based on the Prediction of Neighbours' Weights," 2022 IEEE International Conference on Visual Communications and Image Processing (VCIP), Suzhou, China, 2022 (Year: 2022).*

Bici et al., "Improved prediction methods for scalable predictive animated mesh compression," J. Vis. Commun. Image Rep., vol. 22 , No. 7, pp. 577-589, 2011. (Year: 2011).*

Ahn et al., "Efficient Fine-Granular Scalable Coding of 3D Mesh Sequences," in IEEE Transactions on Multimedia, vol. 15, No. 3, pp. 485-497, Apr. 2013 (Year: 2013).*

Lei Wei et al. "Weighted Attribute Prediction Based on Morton Code for Point Cloud Compression", IEEE, Dec. 31, 2020 (Dec. 31, 2020). 6 pages.

Chuang Ma et al. "Fast Recolor Prediction Scheme in Point Cloud Attribute Compression", IEEE International Conference on Visual Communications and Image Processing (VCIP), Dec. 31, 2020 (Dec. 31, 2020). 4 pages.

International Search Report in the international application No. PCT/CN2021/076345, mailed on Oct. 26, 2021. 5 pages with English translation.

Written Opinion of the International Search Authority in the international application No. PCT/CN2021/076345, mailed on Oct. 26, 2021. 6 pages with English translation.

* cited by examiner

POINT CLOUD DECODING METHOD, DECODER, AND NON-TRANSITORY COMPUTER-READABLE STORAGE MEDIUM

CROSS-REFERENCE TO RELATED APPLICATION

This application is a continuation of International Application No. PCT/CN2021/076345, entitled "POINT CLOUD DECODING METHOD, DECODER, AND COMPUTER STORAGE MEDIUM", filed on Feb. 9, 2021, the disclosure of which is hereby incorporated by reference in its entirety.

TECHNICAL FIELD

The present disclosure relates to the technical field of video encoding and decoding, and in particular to a point cloud decoding method, a decoder, and a non-transitory computer-readable storage medium.

BACKGROUND

In a Geometry-based Point Cloud Compression (G-PCC) framework, geometric information of a point cloud and attribute information corresponding to each part of the point cloud are separately encoded. After geometric encoding is completed, the geometric information is reconstructed, and the encoding of the attribute information will depend on the reconstructed geometric information. The encoding of the attribute information is mainly for encoding of color information, so as to transform the color information from a spatial domain to a frequency domain to obtain high-frequency coefficients and low-frequency coefficients, and finally the coefficients are quantized and entropy-encoded to generate binary bitstreams.

Spatial scalability is an important function of the G-PCC framework, by which a thumbnail image of a point cloud is generated by decoding bit stream information of part of the point cloud. Currently, the function is mainly used in G-PCC decoders employing octree geometric information. Here, a skip layer represents an octree level that does not need to be decoded in the G-PCC decoder. However, in the related art, for geometry reconstruction processes after spatial scalability, all points within a cube range of octree nodes are usually represented by one geometric point, without taking into consideration different distributions of points inside different nodes. Hence, there exists the problem of large geometric errors in geometry reconstruction processes after spatial scalability.

SUMMARY

Embodiments of the present disclosure provide a point cloud decoding method, a decoder, and a non-transitory computer-readable storage medium, which, in the process of decoding a point cloud, can sufficiently utilize the spatial correlation of the point cloud, thereby reducing the geometric error of geometric information reconstruction and improving decoding efficiency.

The technical solutions of the embodiments of the present disclosure may be implemented as follows.

In a first aspect, an embodiment of the present disclosure provides a point cloud decoding method, which is applied to a decoder. The method includes:

decoding a bitstream, and determining a mode parameter;
in response to the mode parameter indicating to use a spatial scalability mode, determining geometric center coordinates of a current node, and determining, in a point cloud, geometric center coordinates of neighbouring nodes of the current node based on the geometric center coordinates of the current mode;
determining local spatial coordinate means corresponding to the current node based on the geometric center coordinates of the current node and the geometric center coordinates of the neighbouring nodes; and
determining reconstructed geometric information of the current node based on the local spatial coordinate means.

In a second aspect, an embodiment of the present disclosure provides a decoder. The decoder comprises a decoding portion and a determining portion, where
the decoding portion is configured to decode a bitstream; and
the determining portion is configured to: determine a mode parameter; in response to the mode parameter indicating to use a spatial scalability mode, determine geometric center coordinates of a current node, and determine, in a point cloud, geometric center coordinates of neighbouring nodes of the current node based on the geometric center coordinates of the current mode; determine local spatial coordinate means corresponding to the current node based on the geometric center coordinates of the current node and the geometric center coordinates of the neighbouring nodes; and determine reconstructed geometric information of the current node based on the local spatial coordinate means.

In a third aspect, an embodiment of the present disclosure provides a decoder. The decoder includes a processor, and a memory storing instructions executable by the processor, where the instructions, when executed by the processor, cause the processor to perform the point cloud decoding method as described above.

In a fourth aspect, an embodiment of the present disclosure provides a non-transitory computer-readable storage medium. The non-transitory computer-readable storage medium stores a computer program. When the computer program is executed by a processor, the point cloud decoding method as described above is implemented.

A point cloud decoding method, a decoder, and a non-transitory computer-readable storage medium are disclosed in the embodiments of the present disclosure. The decoder is configured to: decode a bitstream and determine a mode parameter; in response to the mode parameter indicating to use a spatial scalability mode, determine geometric center coordinates of a current node, and determines, in a point cloud, geometric center coordinates of neighbouring nodes of the current node based on the geometric center coordinates of the current mode; determine local spatial coordinate means corresponding to the current node based on the geometric center coordinates of the current node and the geometric center coordinates of the neighbouring nodes; and determine reconstructed geometric information of the current node based on the local spatial coordinate means. According to the embodiments of the present disclosure, if the spatial scalability mode is used, the decoder may determine the local spatial coordinate means of the current node in a local space consisting of the current node and the neighbouring nodes based on the geometric center coordinates of the current node and the geometric center coordinates of the neighbouring nodes, and then perform geometric information reconstruction for the current node using the local spatial coordinate means, to determine the corresponding reconstructed geometric information. In the point cloud decoding method proposed in the present disclosure, by taking into consideration different distributions of points inside different nodes in the point cloud, the coordinate means of the current node in the local space can be used to calculate the geometric information of the point cloud after spatial scalability-based encoding, so that the spatial correlation of the point cloud is fully utilized in the decoding process of the point cloud, thereby reducing the geometric error of geometric information reconstruction and improving decoding efficiency.

DETAILED DESCRIPTION

Figure 1:
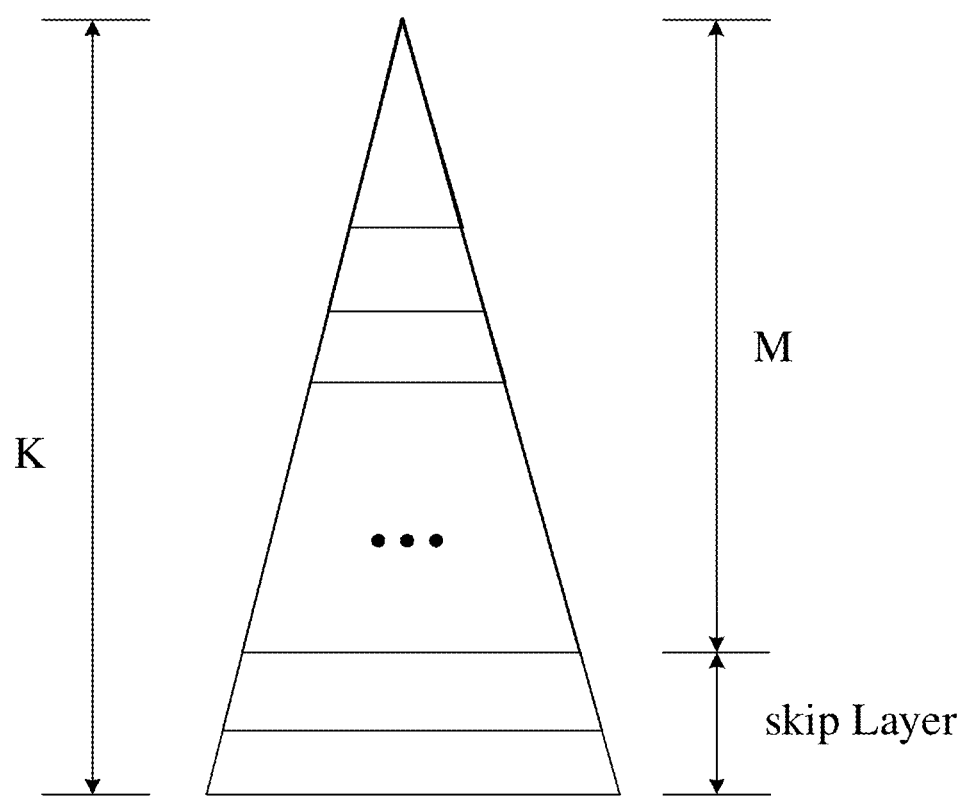
FIG. 1 is a schematic structural diagram of spatial scalability.

To enable the characteristics and technical contents of the embodiments of the present disclosure to be more fully understood, the implementations of the embodiments of the present disclosure will be described in detail below with reference to the drawings, which are for reference and description only, and are not intended to limit the embodiments of the present disclosure.

Unless otherwise defined, all technical and scientific terms used herein have the same meanings as commonly understood by those skilled in the art to which the present disclosure belongs. The terms used herein are only for the purpose of describing the embodiments of the present disclosure, and are not intended to limit the present disclosure.

"Some embodiments" involved in the following descriptions describes a subset of all possible embodiments, but it can be understood that "some embodiments" may be the same subset or different subsets of all possible embodiments, and may be combined with each other without conflict.

It is to be noted that the term "first\ second\third" involved in the embodiments of the present disclosure is only to distinguish similar objects, and does not represent a specific ordering of objects. It can be understood that the specific order or sequential order of "first\ second\third" may be interchanged if allowed, so that the embodiments of the present disclosure described herein can be implemented in an order other than those illustrated or described herein.

Before the embodiments of the present disclosure are further described in detail, the nouns and terms involved in the embodiments of the present disclosure are illustrated. The nouns and terms involved in the embodiments of the present disclosure are applicable to the following explanations.

1) Point Cloud Compression (PCC)
2) Geometry-based Point Cloud Compression (G-PCC)
3) Slice
4) Bounding box
5) Octree
6) Intra prediction
7) Triangle soup (trisoup)
8) Context-based Adaptive Binary Arithmetic Coding (CABAC)
9) Block
10) Vertex
11) Level of Detail (LOD)
12) Region Adaptive Hierarchal Transform (RAHT)
13) Skip Layer
14) Spatial Scalability
15) Moving Picture Experts Group (MPEG)
16) International Standardization Organization (ISO)
17) International Electrotechnical Commission (IEC)
18) Minimum Geometry Node Size Log 2 (MinGeomNodeSizeLog 2)
19) Direct Point Count (DirectPointCount)

Here, a point cloud is a three-dimensional representation of the surface of an object, and the point cloud (data) of the surface of the object may be acquired by an acquisition device such as an electro-optical radar, a laser radar, a laser scanner, a multi-view camera or the like.

The point cloud refers to a set of massive three-dimensional points, and a point in the point cloud may include position information of the point and attribute information of the point. For example, the position information of the point may be three-dimensional coordinate information of the point. The position information of the point may also be referred to as geometric information of the point. For example, the attribute information of the point may include at least one of color information or reflectance, etc. For example, the color information may be information in any one of color spaces. For example, the color information may be Red-Green-Blue (RGB) information, where R represents red (R), G represents green (G), and B represents blue (B). For another example, the color information may be luminance and chrominance (YcbCr, YUV) information, where Y represents luminance (Luma), Cb (U) represents blue color difference, and Cr (V) represents red color difference.

For a point cloud obtained according to the principle of laser measurement, a point in the point cloud may include three-dimensional coordinate information of the point and laser reflectance of the point. For another example, for a point cloud obtained according to the principle of photographic measurement, a point in the point cloud may include three-dimensional coordinate information of the point and color information of the point. For another example, for a point cloud obtained by combining the principles of laser measurement and photographic measurement, a point in the point cloud may include three-dimensional coordinate information of the point, laser reflectance of the point, and color information of the point.

Point clouds may be divided into the following three categories according to the acquisition manner of the point clouds:
- static point clouds (first category): the object is stationary, and the device acquiring the point cloud is also stationary;
- dynamic point clouds (second category): the object is moving, but the device acquiring the point cloud is stationary; and
- dynamically acquired point clouds (third category): the device acquiring the point cloud is moving.

For example, point clouds are divided into the following two broad categories according to the use of the point clouds:
- category 1: machine perception point clouds, which may be applied to scenarios such as autonomous navigation systems, real-time inspection systems, geo-information systems, visual sorting robots, emergency rescue robots, etc.; and
- category 2: human eye perception point clouds, which may be applied to point cloud application scenarios such as digital cultural heritage, free viewpoint broadcasting, three-dimensional immersive communication, and three-dimensional immersive interaction.

Since a point cloud is a set of massive points, storing the point cloud will not only consume significant amounts of memory, but also does not facilitate transmission. In addition, there is no such a large bandwidth that can support the transmission of the point cloud directly at a network layer without compression. Therefore, the point cloud needs to be compressed.

Up until now, a point cloud coding framework that can compress point clouds may be a Geometry Point Cloud Compression (G-PCC) coding framework or a Video Point Cloud Compression (V-PCC) coding framework provided by the Moving Picture Experts Group (MPEG), or an AVS-PCC coding framework provided by the Audio Video Standard (AVS). The G-PCC coding framework may be used to compress static point clouds (first category) and dynamically acquired point clouds (third category), and the V-PCC coding framework may be used to compress dynamic point clouds (second category). The G-PCC coding framework is also referred to as a point cloud codec TMC13, and the V-PCC coding framework is also referred to as a point cloud codec TMC2.

It can be understood that in a point cloud G-PCC encoder framework, an input point cloud is divided into slices, and the slices are then independently encoded. In a slice, the geometric information of the point cloud and the attribute information corresponding to points in the point cloud are separately encoded. A G-PCC encoder first encodes the geometric information. The encoder performs coordinate transformation on the geometric information, so that the entire point cloud is included in a bounding box; and then performs quantization. This operation of quantization mainly has the function of scaling. Due to the rounding of the quantization, the geometric information of some points is the same, and whether to remove duplicate points is determined according to parameters. Compression without removing duplicate points is referred to as geometric lossless compression, compression with duplicate points removed is referred to as geometric lossy compression, and the process of quantization and removing duplicate points is referred to as voxelization. Next, octree-based division is performed on the bounding box. According to differences in the level depth of octree division, the coding of the geometric information is divided into octree-based and trisoup-based frameworks.

In the octree-based geometric information coding framework, the bounding box is equally divided into eight sub-cubes, and occupancy bits of the sub-cubes (where 1 is non-null, and 0 is null) are recorded. A non-null sub-cube continues to be equally divided into eight parts. Usually, the division is stopped when unit cubes with leaf nodes being 1×1×1 are obtained by division. In this process, the spatial correlation between a node and its surrounding nodes is utilized to perform intra prediction on the occupancy bits, and finally arithmetic coding (CABAC) is performed to generate a binary geometric bit stream, i.e., a geometry bitstream.

In the trisoup-based geometric information coding framework, the octree division is also performed first, but the difference with the octree-based geometric information coding is that: in this method, the point cloud does not need to be divided stage by stage into unit cubes with edge lengths of 1×1×1, and the division stops when the edge length of a divided block is W. On the basis of the surface formed by the distribution of the point cloud in each block, at most twelve vertices generated by the surface and twelve edges of the block are obtained Finally, the vertex coordinates of each block are sequentially encoded to generate a binary bit stream, i.e., a geometry bitstream.

After completing the geometric information encoding, the G-PCC encoder reconstructs the geometric information, and encodes the attribute information of the point cloud using the reconstructed geometric information. In the octree-based geometric information coding framework, both geometric lossless compression and geometric lossy compression undergo a geometric reconstruction process upon completion of the octree division. Currently, the attribute encoding of the point cloud is mainly to encode color information of points in the point cloud. First, the encoder may perform color space transform on the color information of the points. For example, when the color information of the points in the input point cloud is represented by the RGB color space, the encoder may transform the color information from the RGB color space to the YUV color space. The point cloud is then re-colored using the reconstructed geometric information, so that the uncoded attribute information corresponds to the reconstructed geometric information. In the color information encoding, there are mainly two transform methods. One method is distance-based lifting transform dependent on LOD division, and the other method is to directly perform RAHT transform. The two methods are both used to transform color information from the spatial domain to the frequency domain to obtain high-frequency coefficients and low-frequency coefficients. Finally, the coefficients are quantized and arithmetically encoded to generate a binary attribute bit stream, i.e., an attribute bitstream.

In a point cloud G-PCC decoder framework, the geometric bit stream of the point cloud and the attribute bit stream corresponding to the points in the point cloud are separately decoded. A G-PCC decoder decodes the geometric bit stream. The decoder arithmetically decodes the geometric bit stream to obtain the bounding box and the octree-based occupancy bits (where 1 is non-null, and 0 is null) of the point cloud. According to differences in the level depth of the octree division during encoding, the decoding of geometric information is divided into octree-based and trisoup-based frameworks.

It should be noted that spatial scalability is an important function of G-PCC, by which a thumbnail image of a point cloud is generated by decoding bit stream information of part of the point cloud. Currently, the function is only used in G-PCC decoder frameworks based on octree geometric information. A skip Layer is an octree level that the decoder does not decode.

FIG. 1 is a schematic structural diagram of spatial scalability. As shown in FIG. 1, the octree geometric encoding is performed up to the Kth layer. At this time, if the decoder does not perform a spatial scalability process for decoding, then the K layers will be fully decoded; and if the decoder performs the spatial scalability process for partially decoding, then the decoding will end at the M layer (M=K−skip Layer), where the skip Layer represents an octree level that does not require decoding.

It should be noted that the spatial scalability function is controlled by a parameter scalable_lifting_enabled_flag. If scalable_lifting_enabled_flag=0, it represents that the spatial scalability function is not performed; and if scalable_lifting_enabled_flag=1, it represents that the spatial scalability function is performed.

In the octree-based geometric information decoding framework, the largest cubic box of the current point cloud in space is calculated according to the bounding box, and then a non-null sub-cube continues to be equally divided into eight parts according to the occupancy bits. Usually, the division is stopped when unit cubes with leaf nodes being 1×1×1 are obtained by division. However, if the spatial scalability function is performed during the decoding process, then division is performed up to a specified skip Layer, and $2^{skipLayer} \times 2^{skipLayer} \times 2^{skipLayer}$ cubes are generated at the time. Thereafter, geometric coordinate information is generated by means of the cubes. Here, for a unit cube with leaf nodes being 1×1×1, the geometric coordinates are the lower left front corner coordinates of the cube, and for a unit cube with leaf nodes being $2^{skipLayer} \times 2^{skipLayer} \times 2^{skipLayer}$ the geometric coordinates are determined using different reconstruction strategies obtained according to different skip Layers.

In an embodiment of the present disclosure, in a point cloud G-PCC encoder framework, a point cloud input into a three-dimensional image model is divided into slices, and each slice is independently encoded.

Figure 2:
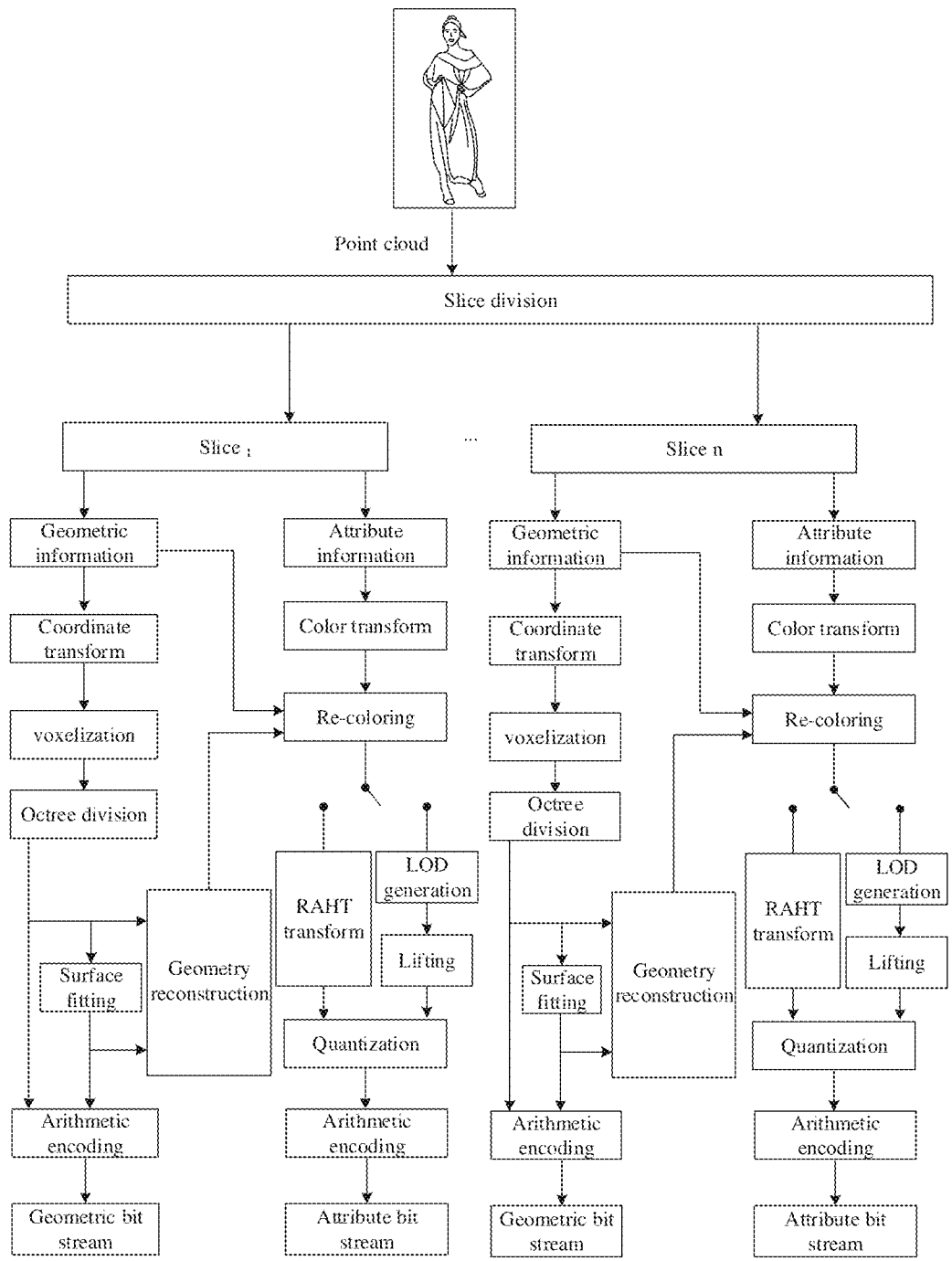
FIG. 2 is a schematic diagram of a framework of a G-PCC encoder.

FIG. 2 is a schematic diagram of the framework of a G-PCC encoder. In the schematic diagram of the framework of a G-PCC encoder as shown in FIG. 2, the framework is applied to a point cloud encoder. For point cloud data to be encoded, the point cloud data is first divided into a plurality of slices by means of slice division. In each slice, the geometric information of a point cloud and attribute information corresponding to each point in the point cloud are separately encoded. In the geometric encoding process, coordinate transform is performed on the geometric information, so that the entire point cloud is included in a bounding box; and then quantization is performed. This step of quantization mainly has the function of scaling. Due to the rounding of the quantization, the geometric information of part of the point cloud is the same. Then, whether to remove duplicate points is determined according to parameters. The process of quantization and removing duplicate points is referred to as voxelization. Next, octree division is performed on the bounding box. In the octree-based geometric information encoding process, the bounding box is equally divided into 8 sub-cubes, a non-null sub-cube (including points in the point cloud) continues to be equally divided into eight parts, and the division is stopped until unit cubes with leaf nodes being 1×1×1 are obtained by division. Arithmetic encoding is performed on the points in the leaf nodes to generate a binary geometric bit stream, i.e., a geometry bitstream. In the triangle soup (trisoup)-based geometric information encoding process, the octree division is also performed first, but different from the octree-based geometric information encoding, the point cloud in the trisoup-based geometric information encoding process does not need to be divided stage by stage into unit cubes with edge lengths of 1×1×1, and the division stops when the edge length of a divided block (sub-block) is W. On the basis of the surface formed by the distribution of the point cloud in each block, at most twelve vertices generated by the surface and twelve edges of the block are obtained. The vertices are arithmetically encoded (vertex-based surface fitting) to generate a binary geometric bit stream, i.e., a geometry bitstream. The vertices are also used for implementing a geometry reconstruction process, and the reconstructed geometric information is used during point cloud attribute encoding.

In the attribute encoding process, when the geometric encoding is completed, and after the geometric information is reconstructed, color transform is performed to transform the color information (i.e., attribute information) from the RGB color space to the YUV color space. The point cloud is then re-colored using the reconstructed geometric information, so that the uncoded attribute information corresponds to the reconstructed geometric information. The attribute encoding is mainly for color information. In the color information encoding process, there are mainly two transform methods. One method is distance-based lifting transform dependent on Level of Detail (LOD) division, and the other method is to directly perform RAHT transform. The two methods are both used to transform the color information from the spatial domain to the frequency domain to obtain high-frequency coefficients and low-frequency coefficients, and then the coefficients are quantized (i.e., quantized coefficients). Finally, the geometric encoding data that has undergone octree division and surface fitting and the attribute encoding data processed with the quantized coefficients are slice-synthesized, and then the vertex coordinates of each block are sequentially encoded (i.e., arithmetic encoding) to generate a binary attribute bit stream, i.e., an attribute bitstream.

Figure 3:
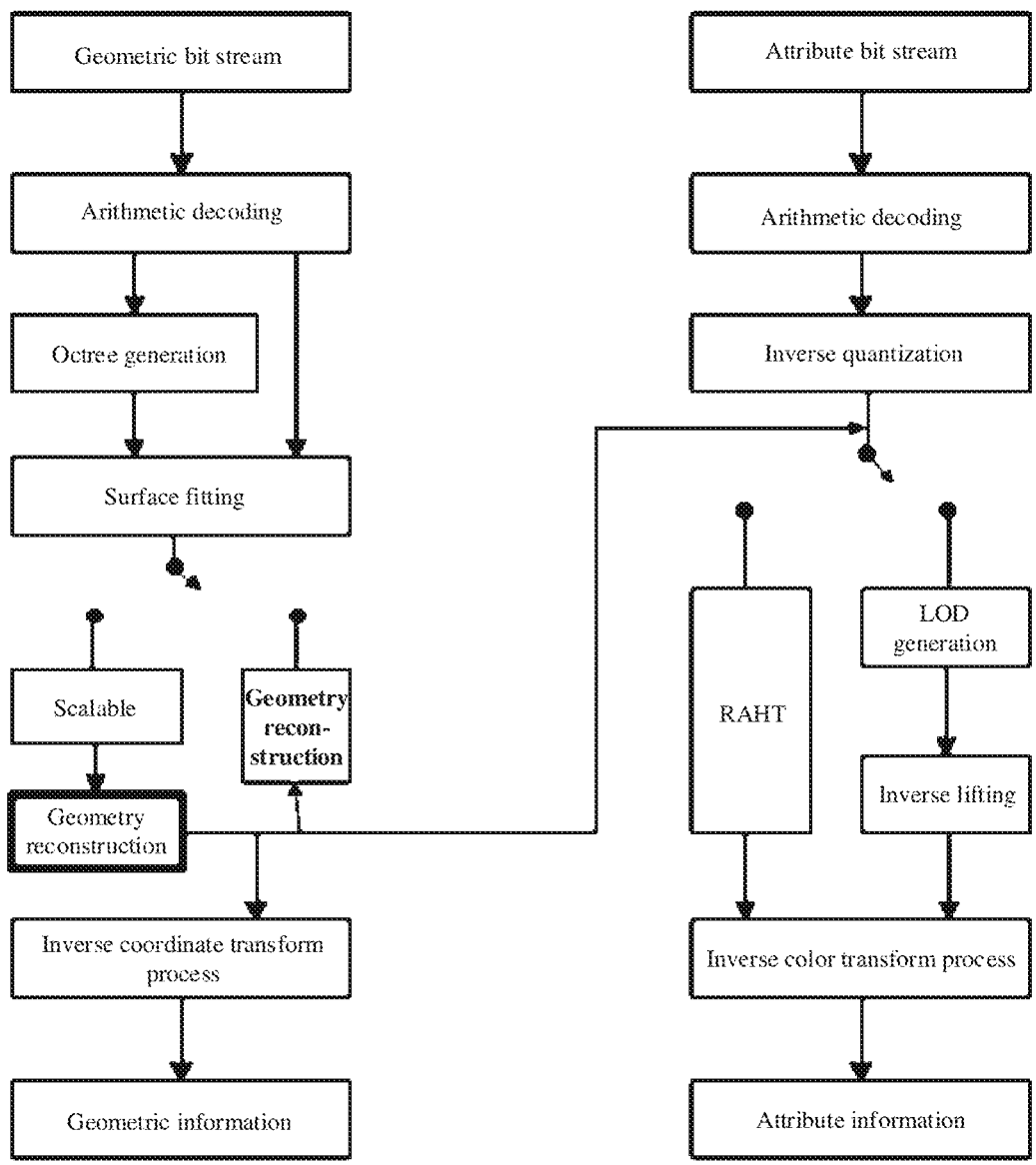
FIG. 3 is a schematic diagram of a framework of a G-PCC decoder.

FIG. 3 is a schematic diagram of the framework of a G-PCC decoder. As shown in FIG. 3, the framework is applied to a point cloud decoder. For an obtained binary bitstream, after the binary bitstream is obtained, a geometric bit stream and an attribute bit stream in the binary bitstream are each independently decoded. When the geometric bit stream is decoded, the geometric information of the point cloud is obtained by means of arithmetic decoding, octree synthesis, surface fitting, geometry reconstruction, and an inverse coordinate transform process. Here, after the surface fitting, the operation of performing geometry reconstruction may be selected, or the operation of performing scalable-geometry reconstruction may also be selected, which is mainly determined according to whether the spatial scalability function is performed. In addition, when the attribute bit stream is decoded, the attribute information of the point cloud is obtained by means of arithmetic decoding, inverse quantization, LOD-based inverse lifting or RAHT-based inverse transform, and an inverse color transform process, and a three-dimensional image model of the point cloud data to be encoded is restored on the basis of the geometric information and attribute information.

However, in the present related art, an existing scalability encoding geometry reconstruction method was proposed in the protocol in January 2020, and has been adopted by the MPEG G-PCC standard (i.e., MPEG-I (ISO/IEC 23090) Part 9). This technical solution uses different reconstruction strategies according to different levels of the skip Layer.

Figure 4:
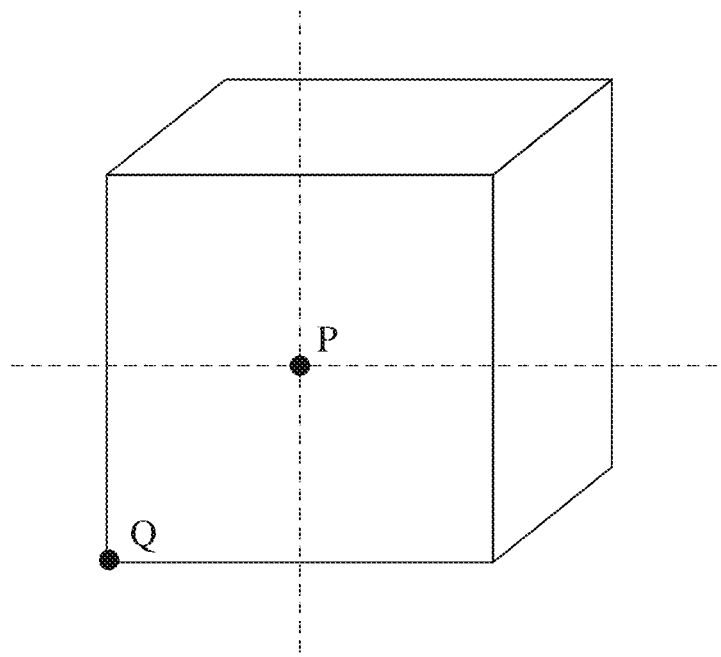
FIG. 4 is a schematic diagram of a geometric reconstruction method in the related art.

Specifically, FIG. 4 is a schematic diagram of a current geometry reconstruction method. As shown in FIG. 4, for different levels of the skip Layer, a specific implementation of the decoder is described as follows:

When skip Layer=1, the geometric coordinates are coordinate information of the lower left front corner of the cube, as in the position of point Q in FIG. 4.

When skip Layer>1, the geometric coordinates are coordinate information of the center position of the cube, as in the position of point P in FIG. 4.

This technical solution is in Appendix C of the MPEG G-PCC standard. For the position shift process during decoding, when MinGeomNodeSizeLog2 is greater than 1, a specific operation for each slice of a current point cloud image in the octree-based geometric information decoding framework is as follows:

```
mask=(-1) << MinGeomNodeSizeLog2
for(i=0; i < PointCount; i++) {
   PointPos[i][0]=(PointPos[i][0] & mask) + (1 << (MinGeomNodeSizeLog2-1))
   PointPos[i][1]=(PointPos[i][1] & mask) + (1 << (MinGeomNodeSizeLog2-1))
   PointPos[i][2]=(PointPos[i][2] & mask) + (1 << (MinGeomNodeSizeLog2-1))
}
```

Here, MinGeomNodeSizeLog2 represents the minimum node edge length of a current octree, which is numerically equal to the skip Layer; PointCount represents the total number of nodes when the current slice is decoded to the MinGeomNodeSizeLog2 level; PointPos[i][0] represents the x-axis coordinate of the reconstructed geometric point of a current node; PointPos[i][1] represents the y-axis coordinate of the reconstructed geometric point of the current node; PointPos[i][2] represents the z-axis coordinate of the reconstructed geometric point of the current node; and mask represents an intermediate mask.

It should be noted that the initial values of PointPos[i][0], PointPos[i][1], and PointPos[i][2] may be the coordinates of the lower front left corner of the node cube whose edge length is currently MinGeomNodeSizeLog2, as shown by the coordinates of the position of point Q in FIG. 4. After the above code shift operation, the values of PointPos[i][0], PointPos[i][1], and PointPos[i][2] will be equal to the coordinates of the center position on the current node cube, as shown by the coordinates of the position of point P in FIG. 4.

It should further be noted that since only part of geometric bit stream information is decoded, and all points in the range of a node space whose edge length is the skip Layer are represented by a single geometric point in the node space, the geometry reconstruction process after spatial scalability is a lossy process. Currently, G-PCC uses the following two methods to measure a geometric error of the process.

Figure 5:
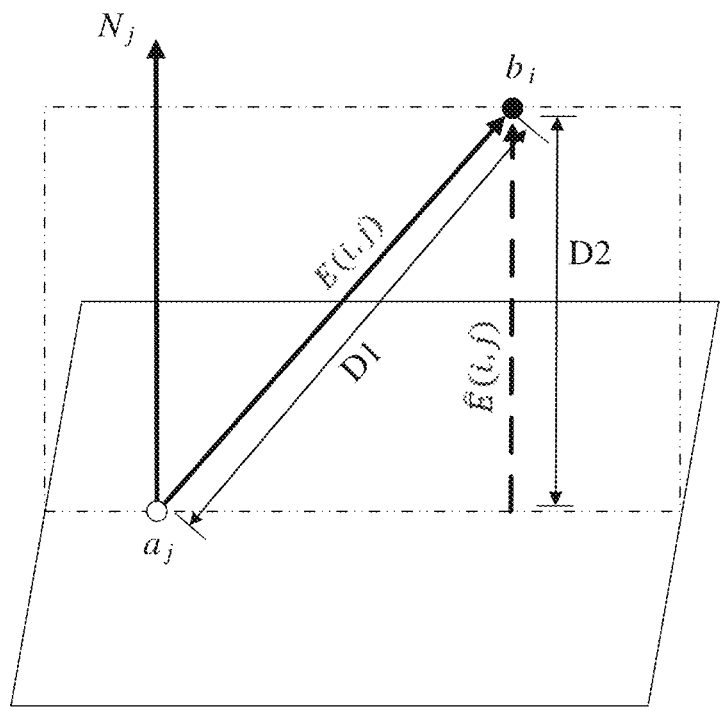
FIG. 5 is a schematic structural diagram of a point-to-point error measurement.

The first method is to use point-to-point distance representation. FIG. 5 is a schematic structural diagram of a point-to-point error measurement. As shown in FIG. 5, a calculation process of the point-to-point geometric error measurement includes: a black point ($b_i$) is a point generated after point cloud scalable coding, and a white point ($a_j$) is a point closest thereto in an original point cloud. The difference between the coordinates of the black point and the white point is a point-to-point error vector, which may be represented by E(i,j)=$b_i$−$a_j$. The length of the error vector is a point-to-point geometric error, i.e., $e_{B,A}^{D1}(i) = E(i,j)_2^2$, where B is a sparse point cloud after scalable encoding, and A is the original point cloud. According to the point-to-point distance $e_{B,A}^{D1}(i)$ of all points i∈B, with $N_B$ being the number of points in point cloud B, the point-to-point error D1 defining the entire point cloud is calculated as shown in formula (1).

$$e_{B,A}^{D1} = \frac{1}{N_B} \sum_{\forall b_i \in B} e_{B,A}^{D1}(i) \tag{1}$$

The other method is to use point-to-plane distance representation. Here, as shown in FIG. 5, an error vector E(i,j) is projected along a normal direction $N_j$ to obtain a new error vector Ê(i,j). In this way, the point-to-plane error D2 is calculated as shown in formula (2).

$$e_{B,A}^{D2}(i) = \|E(i,j)\|_2^2 = \frac{N_j \cdot E(i,j)}{\|N_j\|} \tag{2}$$

Where $\|N_j\|$ represents that norm L1 is used, and norm L1 is the sum of the absolute values of corresponding vectors, as shown in formula (3); and $\|E(i,j)\|_2$ represents that norm L2 is used, and norm L2 is the square root of the cumulative sum of the square terms of the corresponding vectors, as shown in formula (4).

$$\|x\| = +|x_2|+|x_3|+ \ldots +|x_n| \tag{3}$$

$$\|x\|_2 = (|x_1|^2+|x_2|^2+|x_3|^2+ \ldots +|x_n|^2)^{1/2} \tag{4}$$

In existing geometry reconstruction processes after spatial scalability, the same geometry reconstruction method is used for all nodes of the skip Layer (for example, when skip Layer=1, the geometric coordinates of all the nodes are coordinate information of the lower front left corner of the node cube; when skip Layer>1, the geometric coordinates of all the nodes are coordinate information of the center position on the node cube). If the geometric coordinates of the node are numerically closer to the coordinate means of all points (the mean value of the coordinates of all points) in the node, the point-to-point error measurement will be smaller. On the contrary, if the geometric coordinates of the node are more numerically deviated from the coordinate means of all points in the node, the point-to-point error measurement will be larger.

However, the current technical solution does not take into account different distributions of points inside different nodes. If the coordinate means of all points within the current node are far away from the center position and the position of the lower front left corner of the cube, the current technical solution may increase the geometric error in the geometry reconstruction process after spatial scalability.

To solve the problems described above, in the embodiments of the present disclosure, by taking into consideration different distributions of points inside different nodes in the point cloud, the local spatial coordinate means of the current node in a local space consisting of the current node and neighbouring nodes can be determined based on determination of the geometric center coordinates of the current node and the geometric center coordinates of the neighbouring nodes, and then the means can be used to reconstruct geometric information of the current node, so that the spatial correlation of the point cloud is fully utilized, thereby reducing the error of geometry reconstruction after spatial scalability.

It should be noted that the point cloud decoding method proposed in the embodiment of the present disclosure is applied to a video decoding device, i.e., a G-PCC decoder, which may also be simply referred to as a decoder. The functions achieved by the method may be implemented by a processor in a decoder to invoke a computer program. Of course, the computer program may be saved in a memory. Hence, the decoder includes at least a processor and a memory.

It should further be noted that on the basis of the framework of a G-PCC decoder shown in FIG. 3, the method provided in the embodiment of the present disclosure is mainly applied to the part of "geometry reconstruction" marked by a bold frame, to optimize the geometry reconstruction process after spatial scalability in the current related art, thereby improving the utilization of spatial correlation.

The technical solutions in the embodiments of the present disclosure will be clearly and completely described below with reference to the drawings in the embodiments of the present disclosure.

Figure 6:
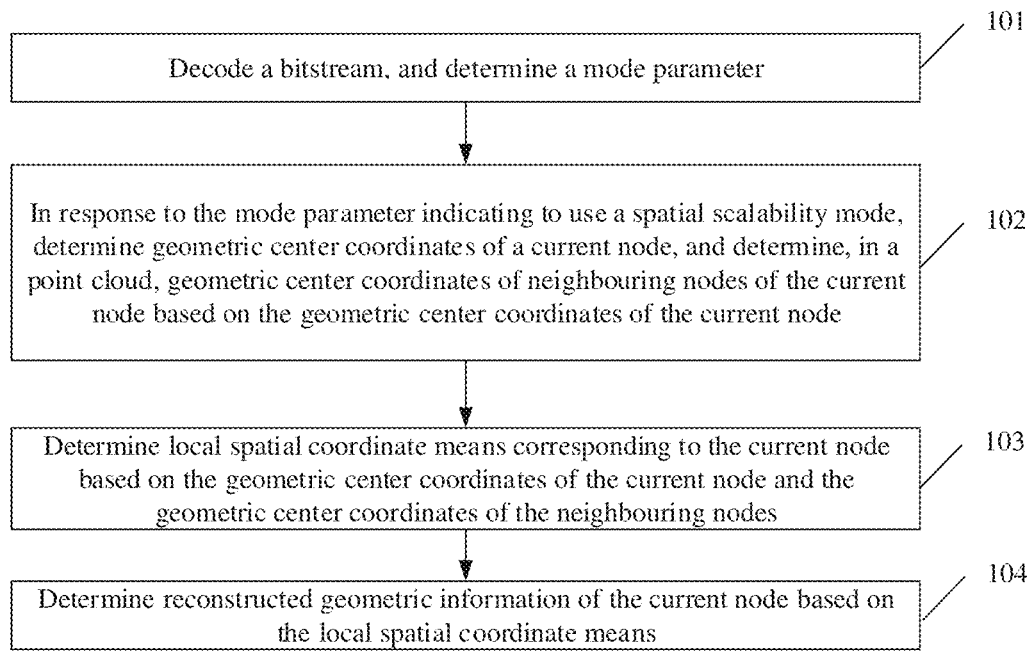
FIG. 6 is a schematic flowchart of an implementation process of point cloud decoding.

An embodiment of the present disclosure provides a point cloud decoding method. FIG. 6 is a schematic flowchart of an implementation process of point cloud decoding. As shown in FIG. 6, in an embodiment of the present disclosure, a point cloud decoding method for a decoder may include the following operations.

At 101, a bitstream is decoded, and a mode parameter is determined.

In an embodiment of the present disclosure, the decoder may decode a bitstream first, so as to determine a mode parameter corresponding to a current decoding framework. The mode parameter may be used to determine a decoding mode used for the current decoding framework. Specifically, on the encoding side, an encoder may assign a value for the mode parameter, and different values indicate different prediction modes.

It should be noted that in an embodiment of the present disclosure, the mode parameter may be used to determine whether the current node uses a spatial scalability mode for decoding. That is, the mode parameter may be spatial scalability enable identification information. Specifically, on the encoding side, the encoder may assign a value to the mode parameter. For example, when the value of the mode parameter is a numerical value, it is considered that a scalable model is used for geometric information reconstruction of the current node. When the value of the mode parameter is another numerical value, it is considered that a scalable model is not used for geometric information reconstruction of the current node.

It can be understood that in an embodiment of the present disclosure, after the decoder obtains the spatial scalability enable identification information by decoding the bitstream, the decoder may determine whether to perform spatial scalability according to the spatial scalability enable identification information. The point cloud decoding method proposed in the present disclosure will be performed only when the spatial scalability enable identification information indicates to perform spatial scalability for decoding in the octree decoding framework.

That is to say, in the present disclosure, in the decoder, whether to perform spatial scalability for decoding in the octree decoding framework may be determined by enable identification information. Here, the enable identification information may be spatial scalability enable identification information (represented by scalable_lifting_enabled_flag), and the value of the spatial scalability enable identification information may be obtained by decoding the bitstream.

Specifically, in the present disclosure, if the value of the spatial scalability enable identification information (mode parameter) is equal to a numerical value, it may be determined that the spatial scalability enable identification information indicates that partial decoding is not performed for decoding in the octree decoding framework, that is, the current point cloud sequence is completely decoded. If the value of the spatial scalability enable identification information (mode parameter) is equal to another numerical value, it may be determined that the spatial scalability enable identification information indicates that partial decoding is performed for decoding in the octree decoding framework, that is, the current point cloud sequence is partially decoded.

Optionally, in the present disclosure, the value of the spatial scalability enable identification information (mode parameter) may be 0 or 1.

Optionally, in the present disclosure, the value of the spatial scalability enable identification information (mode parameter) may be false or true.

Illustratively, in the present disclosure, taking the value of the mode parameter being 0 or 1 as an example, the mode parameter may be controlled by the parameter scalable_lifting_enabled_flag. When scalable_lifting_enabled_flag=0, no spatial scalability is performed, that is, partial decoding is not performed for decoding in the octree decoding framework. When scalable_lifting_enabled_flag=1, spatial scalability is performed, that is, partial decoding is performed for decoding in the octree decoding framework, and only then will the point cloud decoding method proposed in the embodiment of the present disclosure be performed.

Specifically, in the present disclosure, the current node may be all points in the point cloud, or some points in the point cloud, and these points are spatially relatively concentrated.

At 102, in response to the mode parameter indicating to use a spatial scalability mode, determine geometric center coordinates of a current node, and determine, in a point cloud, geometric center coordinates of neighbouring nodes of the current node based on the geometric center coordinates of the current node.

In an embodiment of the present disclosure, after the decoder decodes the bitstream and obtains the mode parameter, if the mode parameter indicates that a spatial scalability mode is used in the current decoding framework, the decoder may determine geometric center coordinates of the current node first, and then further determine, in a point cloud, geometric center coordinates of neighbouring nodes of the current node based on the concentrated center coordinates of the current node.

Further, in an embodiment of the present disclosure, when determining the geometric center coordinates of the current node, the decoder may determine lower left front corner coordinates and an edge length parameter corresponding to the current node first, and then determine the geometric center coordinates of the current node based on the lower left front corner coordinates and the edge length parameter.

It can be understood that in an embodiment of the present disclosure, the decoder may determine the lower left front corner coordinates of the current node by decoding the bitstream.

It should be noted that in the present disclosure, the edge length parameter may be a node edge length corresponding to the current node. Specifically, when the decoder performs spatial scalability-based decoding, the edge length parameter is a node edge length corresponding to the skip Layer at this time.

Specifically, in an embodiment of the present disclosure, the geometric center coordinates of the current node are not geometric information of the current node, but are position coordinates representing the geometric center position of the cube corresponding to the current node.

Figure 7:
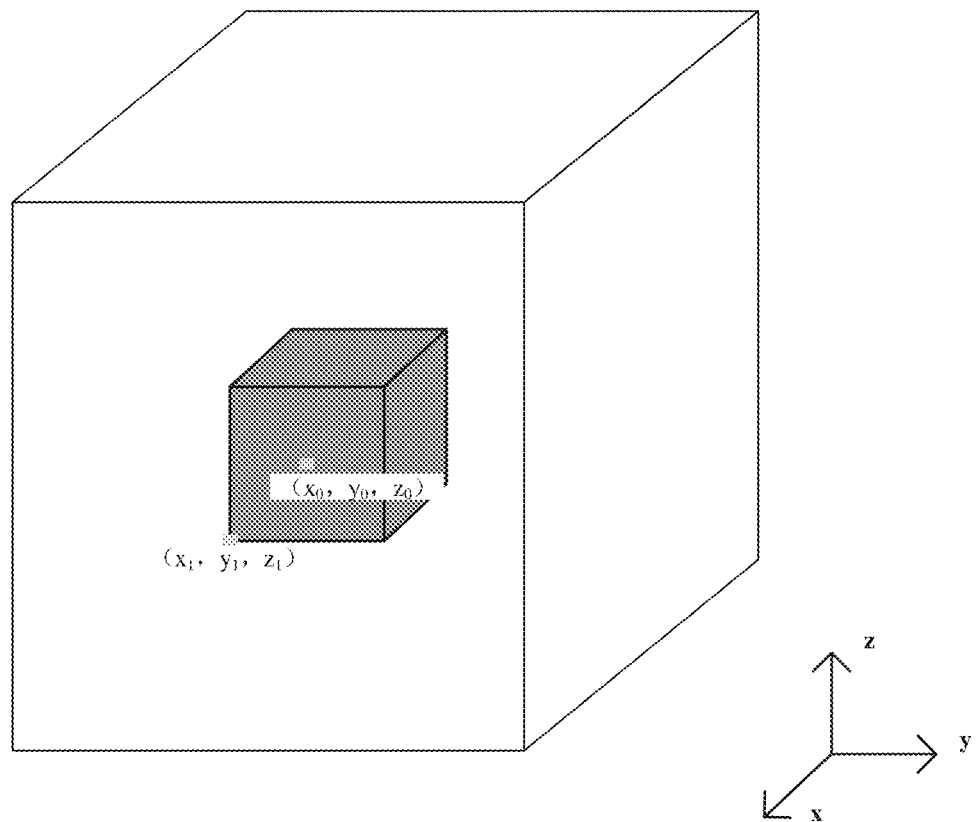
FIG. 7 is a schematic diagram of a current node.

Illustratively, FIG. 7 is a schematic diagram of a current node. As shown in FIG. 7, after the decoder decodes the bitstream, the lower left front corner coordinates $(x_1,y_1,z_1)$ of the current node may be further calculated, and the geometric center coordinates of the current node are the position coordinates $(x_0,y_0,z_0)$ of the geometric center of the cube corresponding to the current node.

Further, in an embodiment of the present disclosure, after the lower left front corner coordinates and the edge length parameter of the current node are determined, the decoder may calculate the geometric center coordinates of the current node.

It can be understood that in an embodiment of the present disclosure, after the geometric center coordinates of the current node is determined, the decoder may further determine the geometric center coordinates of the neighbouring nodes of the current node based on the geometric center coordinates of the current node. The geometric center coordinates of a neighbouring node may be position coordinates of the geometric center position of a cube corresponding to the neighbouring node.

Specifically, in the present disclosure, the decoder may further calculate the geometric center coordinates of the neighbouring nodes according to the geometric center coordinates and the edge length parameter of the current node.

It should be noted that in an embodiment of the present disclosure, the neighbouring nodes of the current node may be co-face neighbouring nodes, co-edge neighbouring nodes and/or co-corner neighbouring nodes that are spatially adjacent to the current node in the point cloud. That is, a neighbouring node may be a co-face neighbouring node adjoining the current node by a face, a co-edge neighbouring node adjoining the current node by an edge; or a co-corner neighbouring node adjoining the current node by a corner.

In some embodiments, six co-face neighbouring nodes of the current node are provided, twelve co-edge neighbouring nodes of the current node are provided, and eight co-corner neighbouring nodes of the current node are provided.

Figure 8:
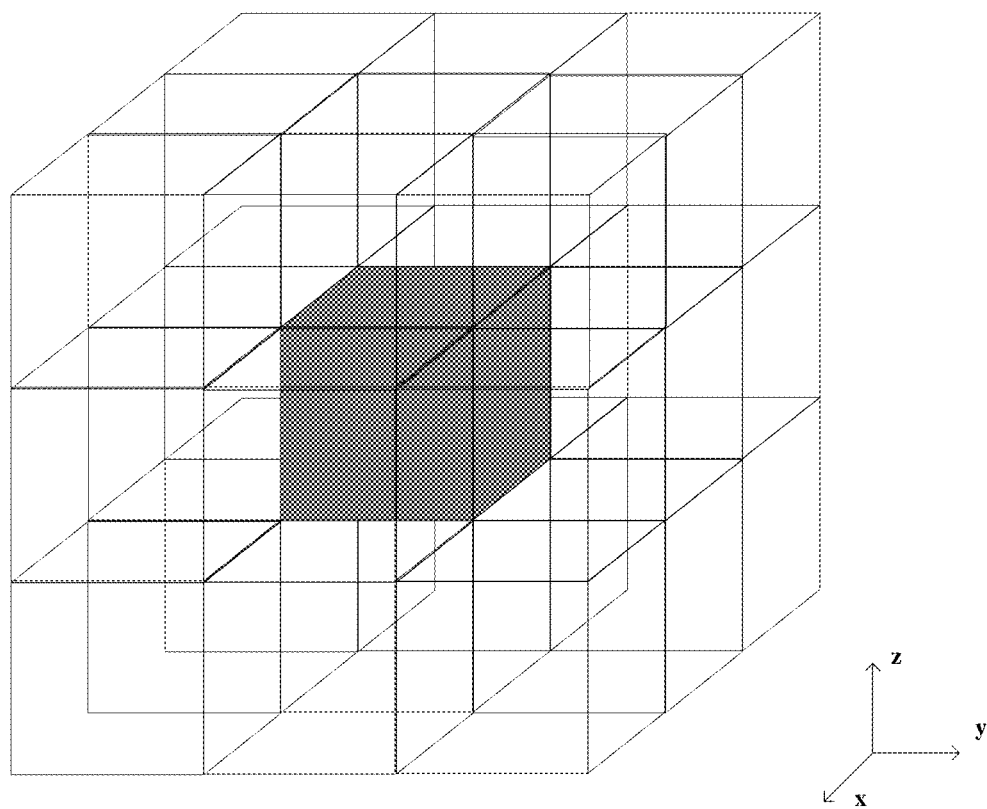
FIG. 8 is a first schematic diagram of neighbouring nodes.

That is to say, in the present disclosure, when a skip Layer corresponding to the current node is not decoded, for the current node in the skip Layer, there are usually 26 neighbouring nodes around the current node. FIG. 8 is a first schematic diagram of neighbouring nodes. As shown in FIG. 8, the point filled with gray color represents the current node, and there are 26 neighbouring nodes around it, among them, six co-face neighbouring nodes are provided, twelve co-edge neighbouring nodes are provided, and eight co-corner neighbouring nodes are provided.

It should be noted that in an embodiment of the present disclosure, the 26 neighbouring nodes may be used as the search range for the current node, or some of the neighbouring nodes (such as only eight co-corner neighbouring nodes, or only six co-face neighbouring nodes and twelve co-edge neighbouring nodes, or only eight co-corner neighbouring nodes and six co-face neighbouring nodes, etc.) may be used as the search range for the current node, which is not specifically defined in the present disclosure.

Figure 9:
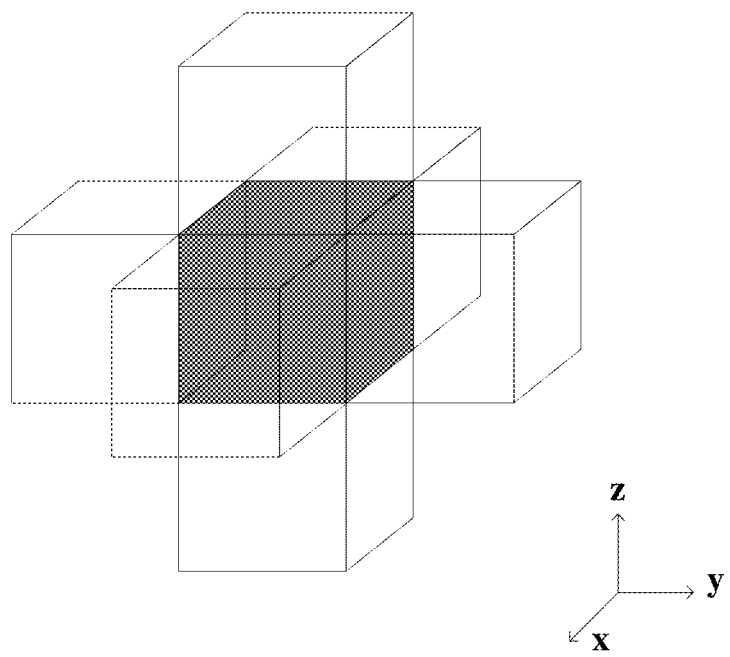
FIG. 9 is a second schematic diagram of neighbouring nodes.

FIG. 9 is a second schematic diagram of neighbouring nodes. As shown in FIG. 9, the point filled with gray color represents the current node, and there are six co-face neighbouring nodes around it.

Figure 10:
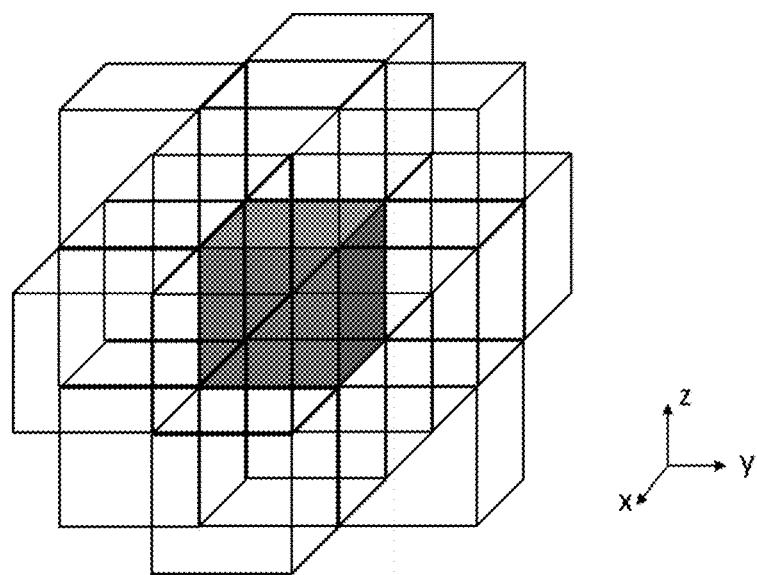
FIG. 10 is a third schematic diagram of neighbouring nodes.

FIG. 10 is a third schematic diagram of neighbouring nodes. As shown in FIG. 10, the point filled with gray color represents the current node, and there are 18 neighbouring nodes around it, where six co-face neighbouring nodes are provided, and twelve co-edge neighbouring nodes are provided.

Correspondingly, in an embodiment of the present disclosure, the geometric center coordinates of a neighbouring node are not geometric information of the neighbouring node, but are position coordinates representing the geometric center position of the cube corresponding to the neighbouring node.

Illustratively, in the present disclosure, when the decoder determines that spatial scalability-based decoding is to be performed on the current node, the edge length parameter (i.e., the node side length) corresponding to the skip Layer where the current node is located may be obtained as L by decoding the bitstream, where $L=2^{skipLayer}$, and at the same time, the lower front left corner coordinates $(x_1,y_1,z_1)$ of the current node may be obtained. Next, the geometric center coordinates $(x_0,y_0,z_0)$ of the node may be calculated based on the lower front left corner coordinates and the node edge length L. By searching for the presence information of the surrounding 26 neighbouring nodes for each node at the skip Layer, and by means of the node edge length L, the center position coordinates $(x_0,y_0,z_0)$ of the current node and the presence information of 26 neighbouring nodes, the geometric center coordinates of a neighbouring node present among the 26 neighbouring nodes can be calculated, where the geometric center coordinates of an i-th neighbouring node are $(x_i,y_i,z_i)$.

In an embodiment of the present disclosure, further, after the decoder determines the mode parameter, if the mode parameter indicates to use the spatial scalability mode, then the decoder will no longer decode the skip layer where the current node is located, that is, the decoder only partially decodes the point cloud sequence of the points where the current node is located, and only decodes layers other than the skip layer where the current node is located.

Correspondingly, in an embodiment of the present disclosure, after the decoder determines the mode parameter, if the mode parameter indicates that no spatial scalability mode is used, then the decoder needs to decode the skip layer where the current node is located, that is, the decoder completely decodes the point cloud sequence of the points where the current node is located.

At 103, local spatial coordinate means corresponding to the current node is determined based on the geometric center coordinates of the current node and the geometric center coordinates of the neighbouring nodes.

In an embodiment of the present disclosure, if the mode parameter indicates to use the spatial scalability mode, after determining the geometric center coordinates of the current node and the geometric center coordinates of the neighbouring nodes, the decoder may further determine local spatial coordinate means of the current node based on the geometric center coordinates of the current node and the geometric center coordinates of the neighbouring nodes.

Further, in an embodiment of the present disclosure, during determining the local spatial coordinate means of the current node based on the geometric center coordinates of the current node and the geometric center coordinates of the neighbouring nodes, the decoder may first determine presence information identifiers corresponding to the neighbouring nodes. The presence information identifier can be used for determining whether a neighbouring node is present within a certain range of the current node.

Illustratively, in the present disclosure, the decoder may use an presence information function to represent whether a neighbouring node is present. For example, the presence information function $g(x_i, y_i, z_i)$ is preset to represent whether a point is present within the following range:

$$x \in \left(x_i - \frac{L}{2}, x_i + \frac{L}{2}\right), y \in \left(y_i - \frac{L}{2}, y_i + \frac{L}{2}\right),$$
$$\text{and } z \in \left(z_i - \frac{L}{2}, z_i + \frac{L}{2}\right),$$

where $(x_i, y_i, z_i)$ represents the geometric center coordinates of an i-th neighbouring node of the current node, L represents the node edge length corresponding to the skip Layer when the decoder performs spatial scalability-based decoding, and $L=2^{\text{skip Layer}}$.

It should be noted that in an embodiment of the present disclosure, for the current node, if a neighbouring node is present within the range of $$x \in \left(x_i - \frac{L}{2}, x_i + \frac{L}{2}\right), y \in \left(y_i - \frac{L}{2}, y_i + \frac{L}{2}\right),$$
$$\text{and } z \in \left(z_i - \frac{L}{2}, z_i + \frac{L}{2}\right)$$

(that is, "a point is present"), the function value of $g(x_i, y_i, z_i)$ may be configured to be equal to 1; and if no neighbouring node point is present in the range (that is, "no point is present"), the function value of $g(x_1, y_1, z_1)$ is equal to 0.

Further, in the present disclosure, the decoder may use the presence information identifiers (the presence information function $g(x_i, y_i, z_i)$ to represent the presence information of the surrounding 26 neighbouring nodes, that it, it may determine the function values of the co-face neighbouring nodes, the function values of the co-edge neighbouring nodes and the function values of the co-corner neighbouring nodes.

It can be understood that in the present disclosure, during determining a presence information identifier of a neighbouring node, the decoder may first determine whether a neighbouring node is present or not based on an information stream, so as to further determine the presence information identifier of the neighbouring node.

Further, in the present disclosure, if it is determined that no neighbouring node is present, the decoder may determine that the value of the presence information identifier of a neighbouring node is a first numerical value; and if it is determined that a neighbouring node is present, the decoder may determine that the value of the presence information identifier of the neighbouring node is a second numerical value.

Illustratively, in the present disclosure, the first numerical value may be 0, and the second numerical value may be 1. Specifically, if it is determined that neighbouring node i is not present for the current node, then the value of the presence information identifier corresponding to neighbouring node i is 0, that is, $g(x_i, y_i, z_i)=0$; and if it is determined that neighbouring node i is present for the current node, then the value of the presence information identifier corresponding to neighbouring node i is 1, that is, $g(x_i, y_i, z_i)=1$.

Further, in the present disclosure, after the presence information identifier of the neighbouring node is determined, the decoder may determine the local spatial coordinate means based on the geometric center coordinates of the current node, the geometric center coordinates of the neighbouring node, and the presence information identifier of the neighbouring node.

Specifically, in the present disclosure, during determining the local spatial coordinate means of the current node, the decoder may input the geometric center coordinates of the current node, the geometric center coordinates of the neighbouring node, and the presence information identifier of the neighbouring node into a preset calculation model, to output the obtained local spatial coordinate means of the current node.

Illustratively, in the present disclosure, the decoder may calculate the local spatial coordinate means $(x',y',z')$ of the current node according to the following formula:

$$\begin{cases} x' = \frac{1}{1+\sum_{i=1}^{26} g(x_i, y_i, z_i)} \left(\sum_{i=1}^{26} g(x_i, y_i, z_i) \cdot x_i + x_0\right) \\ y' = \frac{1}{1+\sum_{i=1}^{26} g(x_i, y_i, z_i)} \left(\sum_{i=1}^{26} g(x_i, y_i, z_i) \cdot y_i + y_0\right) \\ z' = \frac{1}{1+\sum_{i=1}^{26} g(x_i, y_i, z_i)} \left(\sum_{i=1}^{26} g(x_i, y_i, z_i) \cdot z_i + z_0\right) \end{cases} \quad (5)$$

Where $(x_0, y_0, z_0)$ is the geometric center coordinates of the current node, $(x_i, y_i, z_i)$ is the geometric center coordinates of an i-th neighbouring node, $g(x_i, y_i, z_i)$ is the presence information identifier of the i-th neighbouring node, and if the i-th neighbouring node is present, the value of $g(x_i, y_i, z_i)$ is 1, and if the i-th neighbouring node is not present, the value of $g(x_i, y_i, z_i)$ is 0.

Further, in an embodiment of the present disclosure, the geometric center coordinates of the current node may include a first coordinate value in a first spatial direction, a second coordinate value in a second spatial direction, and a third coordinate value in a third spatial direction.

Correspondingly, in the present disclosure, the geometric center coordinates of the neighbouring node may also include a fourth coordinate value in the first spatial direction, a fifth coordinate value in the second spatial direction, and a sixth coordinate value in the third spatial direction.

It can be understood that in the present disclosure, the first spatial direction, the second spatial direction, and the third spatial direction may be an x-axis direction, a y-axis direction, and a z-axis direction, respectively. For example, the first spatial direction is the x-axis direction, and the first and fourth coordinate values corresponding to the geometric center coordinates $(x_0, y_0, z_0)$ of the current node and the geometric center coordinate $(x_i, y_i, z_i)$ of the neighbouring node are $x_0$ and $x_i$, respectively; the second spatial direction is the y-axis direction, and the corresponding second and fifth coordinate values are $y_0$ and $y_i$, respectively; and the third spatial direction is the z-axis direction, the corresponding third and sixth coordinate values are $z_0$ and $z_i$, respectively.

It can be understood that in an embodiment of the present disclosure, during determining the local spatial coordinate means of the current node based on the geometric center coordinates of the current node, the coordinate information, and the presence information identifiers, the decoder may determine, from the neighbouring nodes, a target neighbouring node whose presence information identifier has a value of 1, that is, determine an existing neighbouring node of the current node, and then perform a weighted average on the fourth coordinate value of the target neighbouring node and the first coordinate value, so as to obtain the numerical value of the local spatial coordinate means of the current node in the first spatial direction. Meanwhile, the decoder may further perform a weighted average on the fifth coordinate value of the target neighbouring node and the second coordinate value, so as to obtain the numerical value of the local spatial coordinate means of the current node in the second spatial direction. Meanwhile, the decoder may perform a weighted average on the sixth coordinate value of the target neighbouring node and the third coordinate value, so as to obtain the numerical value of the local spatial coordinate means of the current node in the third spatial direction.

It should be noted that in the present disclosure, when the local spatial coordinate means of the current node are obtained by performing weighted average on the geometric center coordinates of the current node and the geometric center coordinates of the neighbouring nodes, the decoder may use different weight values for the current node and different neighbouring nodes, or may use the same weight value for the current node and all neighbouring nodes, which is not specifically defined in the present disclosure.

At 104, reconstructed geometric information of the current node is determined based on the local spatial coordinate means.

In an embodiment of the present disclosure, after determining the local spatial coordinate means corresponding to the current node based on the geometric center coordinates of the current node and the geometric center coordinates of the neighbouring nodes, the decoder may use the local spatial coordinate means corresponding to the current node to complete geometric information reconstruction of the current node, so as to obtain reconstructed geometric information of the current node.

Specifically, in the present disclosure, during determining the reconstructed geometric information of the current node, the decoder may input the geometric center coordinates and local spatial coordinate means of the current node into a preset calculation model, to output the obtained reconstructed geometric information of the current node.

Illustratively, in the present disclosure, the decoder may calculate the reconstructed geometric information (x, y, z) of the current node according to the following formula:

$$\begin{cases} x = \frac{1}{2}(x' + x_0) \\ y = \frac{1}{2}(y' + y_0) \\ z = \frac{1}{2}(z' + z_0) \end{cases} \quad (6)$$

Where $(x_0, y_0, z_0)$ is the geometric center coordinates of the current node, and $(x', y', z')$ is the local spatial coordinate means of the current node.

Further, in an embodiment of the present disclosure, during determining the reconstructed geometric information of the current node based on the local spatial coordinate means, the decoder may perform a weighted average on the first coordinate value and the numerical value of the local spatial coordinate means in the first spatial direction, to obtain the numerical value of the reconstructed geometric information of the current node in the first spatial direction. Meanwhile, the decoder may perform a weighted average on the second coordinate value and the numerical value of the local spatial coordinate means in the second spatial direction, to obtain the numerical value of the reconstructed geometric information of the current node in the second spatial direction. Meanwhile, the decoder may perform a weighted average on the third coordinate value and the numerical value of the local spatial coordinate means in the third spatial direction, to obtain the numerical value of the reconstructed geometric information of the current node in the third spatial direction.

It can be understood that in the present disclosure, during determining the reconstructed geometric information of the current node by performing weighted average on the geometric center coordinates and local spatial coordinate means of the current node, the decoder may select different weight values used for the geometric center coordinates and local spatial coordinate means of the current node, or may select the same weight value used for the geometric center coordinates and local spatial coordinate means of the current node, which is not specifically defined in the present disclosure.

According to the point cloud decoding method described above in operations 101 to 104, when it is determined that the spatial scalability mode is used to predict the geometric information of the current node, the decoder may determine the geometric center coordinates of the current node and the geometric center coordinates of the neighbouring nodes first, and then further complete the reconstruction of the geometric information of the current node using the geometric center coordinates of the current node and the geometric center coordinates of neighbouring nodes, so as to determine the reconstructed geometric information of the current node.

Specifically, in the present disclosure, the decoder may determine local spatial coordinate means representing coordinate means of the current node d in a local space, and then use the local spatial coordinate means to further calculate the geometric coordinates of the current node after spatial scalability-based encoding has been performed on the point cloud, i.e., determining the reconstructed geometric information of the current node.

It can be understood that in the embodiment of the present disclosure, the local space of the current node consists of the current node and the neighbouring nodes that are adjacent to the current node. Since the neighbouring nodes of the current node may include three types of neighbouring nodes, i.e., co-face neighbouring nodes, co-edge neighbouring nodes, and co-corner neighbouring nodes, the local space of the current node may be formed on the basis of 26 co-corner, co-edge and co-face neighbouring nodes having the same size as that of the current node, that is, the local space may be a space formed by 27 cubes of the same size collectively.

Further, in the present disclosure, the local space of the current node may also be formed on the basis of at least one of the three types of neighbouring nodes having the same size as that of the current node. For example, the local space of the current node may be formed on the basis of six co-face neighbouring nodes and twelve co-edge neighbouring nodes having the same size as that of the current node, that is, the local space may be a space formed by 19 cubes of the same size collectively. The local space of the current node may be formed merely on the basis of six co-face neighbouring nodes having the same size as that of the current node, that is, the local space may be a space formed by seven cubes of the same size collectively.

That is, in the embodiment of the present disclosure, the neighbouring nodes of the current node include at least one of the following: a co-face neighbouring node adjoining the current node by a face; a co-edge neighbouring node adjoining the current node by an edge; or a co-corner neighbouring node adjoining the current node by a corner.

As can be seen, in the point cloud decoding method proposed in the embodiment of the present disclosure, by taking into consideration different distributions of points in different nodes in the point cloud, first, the local spatial coordinate means of the current node in a local space consisting of the current node and neighbouring nodes can be determined on the basis of determination of the geometric center coordinates of the current node and the geometric center coordinates of the neighbouring nodes, and then the means can be used to reconstruct geometric information of the current node, so that the spatial correlation of the point cloud is fully utilized, thereby reducing the error of geometry reconstruction after spatial scalability.

Specifically, in the present disclosure, Table 1 is a comparison of different skip layers where skip Layer=1, 2, 3 and 4.

Where the D1-PSNR is calculated according to the following formula:

$$D1 - PSNR = 10\log_{10}\left(\frac{3\ p^2}{\max(e_{B,A}^{D1}, e_{A,B}^{D1})}\right) \quad (7)$$

and the D2-PSNR is calculated according to the following formula:

$$D2 - PSNR = 10\log_{10}\left(\frac{3\ p^2}{\max(e_{B,A}^{D2}, e_{A,B}^{D2})}\right) \quad (8)$$

where p is a peak constant value for each reference point cloud defined in Table 1, and is determined by the point cloud sequence, and is specifically shown in bold in Table 2.

TABLE 1

PSNR of geometric information

| Point cloud sequence | skip Layer = 1 | | skip Layer = 2 | | skip Layer = 3 | | skip Layer = 4 | |
|---|---|---|---|---|---|---|---|---|
| | D1-PSNR | D2-PSNR | D1-PSNR | D2-PSNR | D1-PSNR | D2-PSNR | D1-PSNR | D2-PSNR |
| basketball_player_vox11_00000200 | 1.28 | 0.7 | 1.96 | 5.33 | 1.93 | 7.73 | 1.7 | 7.86 |
| dancer_vox11_00000001 | 1.32 | 0.83 | 1.94 | 5.31 | 1.84 | 7.48 | 1.58 | 7.48 |
| egyptian_mask_vox12 | 0 | 0 | −0.02 | 0 | −1.25 | 1.08 | 0.55 | 3.86 |
| facade_00009_vox12 | −0.81 | −0.05 | 0.51 | 1.72 | 0.91 | 3.28 | 1.17 | 4.53 |
| frog_00067_vox12 | −0.12 | 0.1 | 0.84 | 2.04 | 1.39 | 4.52 | 1.91 | 6.89 |
| house_without_roof_00057_vox12 | −0.06 | 0.16 | 0.87 | 2.24 | 1.11 | 4.22 | 1.43 | 6.41 |
| longdress_vox10_1300 | 1.29 | 0.68 | 1.76 | 4.32 | 1.27 | 3.98 | 0.89 | 3.94 |
| loot_vox10_1200 | 1.26 | 0.72 | 1.78 | 4.47 | 1.5 | 4.41 | 1.12 | 4.31 |
| queen_0200 | 1.2 | 0.7 | 1.65 | 4.32 | 1.36 | 4.31 | 0.89 | 3.64 |
| redandblack_vox10_1550 | 1.29 | 0.81 | 1.78 | 4.47 | 1.37 | 4.37 | 0.8 | 3.56 |
| shiva_00035_vox12 | −0.23 | 0.05 | −0.3 | 0.35 | 0.1 | 0.49 | 0.86 | 2.46 |
| soldier_vox10_0690 | 1.36 | 0.84 | 1.83 | 4.73 | 1.48 | 3.65 | 1.18 | 4.47 |
| ulb_unicorn_vox13 | −0.04 | 0.02 | −0.1 | 0.13 | −0.31 | 0.65 | 0.18 | 1.21 |
| Average | 0.6 | 0.43 | 1.12 | 3.03 | 0.98 | 3.86 | 1.1 | 4.66 |

TABLE 2

Point cloud sequence peak constant value

| Content Category | Test Class | Test material dataset filename | Frames | fps | # Pts | Geometry Precision | Peak Value (p) | Attributes |
|---|---|---|---|---|---|---|---|---|
| (1) Static Objects and Scenes | A | basketball_player_vox11_00000200 [j] | 1 | | 2,925,514 | 11 bits | 2047 | R, G, B |
| | | boxer_viewdep_vox12 [b] | 1 | | 3,493,085 | 12 bits | 4095 | R, G, B |
| | | dancer_vox11_00000001 [j] | 1 | | 2,592,758 | 11 bits | 2047 | R, G, B |
| | | Egyptian_mask_vox12 [a] | 1 | | 272,684 | 12 bits | 4095 | R, G, B |
| | | Facade_00009_vox12 [a] | 1 | | 1,596,085 | 12 bits | 4095 | R, G, B |
| | | Facade_00015_vox14 [a] | 1 | | 8,907,880 | 14 bits | 16383 | R, G, B |
| | | Facade_00064_vox11 [TBD] | 1 | | 4,061,755 | 11 bits | 2047 | R, G, B |
| | | . . . | . . . | | . . . | . . . | . . . | . . . |

In comparison, when the code rate is the same, compared with geometric errors brought about in current common technologies, the geometric error brought by the point cloud decoding method proposed in the present disclosure is reduced (a Peak Signal-to-Noise Ratio (PSNR) being a positive value) or increased (the PSNR being a negative value) by a numerical value.

The present embodiment provides a point cloud decoding method, which is applied to a decoder. The decoder decodes a bitstream and determines a mode parameter; if the mode parameter indicates to use a spatial scalability mode, the decoder determines geometric center coordinates of a current node, and determines, in a point cloud, geometric center coordinates of neighbouring nodes of the current node based on the geometric center coordinates of the current mode; the decoder determines local spatial coordinate means corresponding to the current node based on the geometric center coordinates of the current node and the geometric center coordinates of the neighbouring nodes; and the decoder determines reconstructed geometric information of the current node based on the local spatial coordinate means. As can be seen, in the embodiments of the present disclosure, if the spatial scalability mode is used, the decoder may determine the local spatial coordinate means of the current node in a local space consisting of the current node and the neighbouring nodes based on the geometric center coordinates of the current node and the geometric center coordinates of the neighbouring nodes, and then perform geometric information reconstruction for the current node using the local spatial coordinate means, to determine the corresponding reconstructed geometric information. That is, in the point cloud decoding method proposed in the present disclosure, by taking into consideration different distributions of points inside different nodes in the point cloud, the coordinate means of the current node in the local space can be used to calculate the geometric information of the point cloud after spatial scalability-based encoding, so that the spatial correlation of the point cloud is fully utilized in the decoding process of the point cloud, thereby reducing the geometric error of geometric information reconstruction and improving decoding efficiency.

Figure 11:
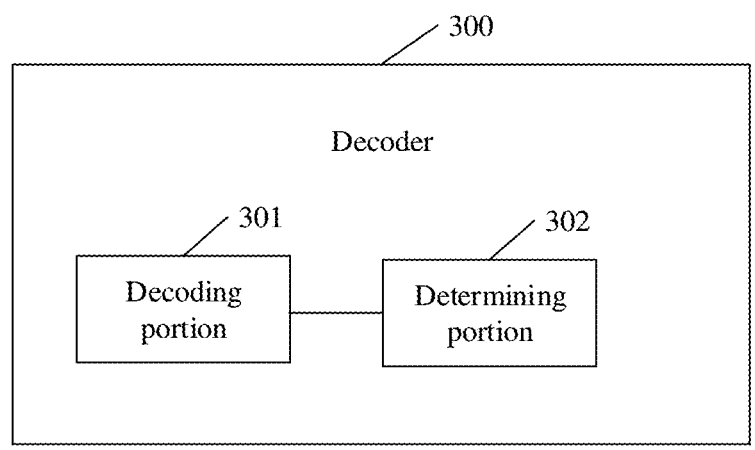
FIG. 11 is a first schematic diagram of the composition structure of a decoder.

On the basis of the above embodiments, in still another embodiment of the present disclosure, FIG. 11 is a first schematic diagram of the composition structure of a decoder. As shown in FIG. 11, a decoder 300 proposed in the embodiment of the present disclosure includes a decoding portion 301, and a determining portion 302.

The decoding portion 301 is configured to decode a bitstream.

The determining portion 302 is configured to: determine a mode parameter; in response to the mode parameter indicating to use a spatial scalability mode, determine geometric center coordinates of a current node, and determine, in a point cloud, geometric center coordinates of neighbouring nodes of the current node based on the geometric center coordinates of the current mode; determine local spatial coordinate means corresponding to the current node based on the geometric center coordinates of the current node and the geometric center coordinates of the neighbouring nodes; and determine reconstructed geometric information of the current node based on the local spatial coordinate means.

Further, in an embodiment of the present disclosure, the decoding portion 301 is further configured to: if the mode parameter indicates to use the spatial scalability mode, not decode a skip Layer where the current node is located.

Further, in the present disclosure, the decoding portion 301 is further configured to: if the mode parameter indicates that no spatial scalability mode is used, decode the skip Layer where the current node is located.

Further, in an embodiment of the present disclosure, the determining portion 302 is further configured to determine presence information identifiers of the neighbouring nodes.

Further, in an embodiment of the present disclosure, the determining portion 302 is specifically configured to determine the local spatial coordinate means based on the geometric center coordinates of the current node, and the geometric center coordinates and the presence information identifiers of the neighbouring nodes.

Further, in an embodiment of the present disclosure, the determining portion 302 is further specifically configured to: if it is determined based on an information stream that no neighbouring node is present, determine that the presence information identifier has a first numerical value; and if it is determined based on the information stream that the neighbouring node is present, determine that the presence information identifier has a second numerical value.

Further, in an embodiment of the present disclosure, the geometric center coordinates of the current node include a first coordinate value in a first spatial direction, a second coordinate value in a second spatial direction, and a third coordinate value in a third spatial direction; and the geometric center coordinates of each neighbouring node include a fourth coordinate value in the first spatial direction, a fifth coordinate value in the second spatial direction, and a sixth coordinate value in the third spatial direction.

Further, in an embodiment of the present disclosure, the determining portion 302 is further specifically configured to: determine, from the neighbouring nodes, a target neighbouring node whose presence information identifier has a value of 1; perform a weighted average on the fourth coordinate value of the target neighbouring node and the first coordinate value to obtain a numerical value of the local spatial coordinate means of the current node in the first spatial direction; perform a weighted average on the fifth coordinate value of the target neighbouring node and the second coordinate value to obtain a numerical value of the local spatial coordinate means of the current node in the second spatial direction; and perform a weighted average on the sixth coordinate value of the target neighbouring node and the third coordinate value to obtain a numerical value of the local spatial coordinate means of the current node in the third spatial direction.

Further, in an embodiment of the present disclosure, the determining portion 302 is further specifically configured to: perform a weighted average on the first coordinate value and the numerical value of the local spatial coordinate means in the first spatial direction to obtain a numerical value of the reconstructed geometric information of the current node in the first spatial direction; perform a weighted average on the second coordinate value and the numerical value of the local spatial coordinate means in the second spatial direction to obtain a numerical value of the reconstructed geometric information of the current node in the second spatial direction; and perform a weighted average on the third coordinate value and the numerical value of the local spatial coordinate means in the third spatial direction to obtain a numerical value of the reconstructed geometric information of the current node in the third spatial direction.

Further, in an embodiment of the present disclosure, the determining portion 302 is further specifically configured to: determine lower left front corner coordinates and an edge length parameter corresponding to the current node; and determine the geometric center coordinates of the current node based on the lower left front corner coordinates and the edge length parameter.

Further, in an embodiment of the present disclosure, the neighbouring nodes of the current node include at least one of the following: a co-face neighbouring node adjoining the current node by a face; a co-edge neighbouring node adjoining the current node by an edge; or a co-corner neighbouring node adjoining the current node by a corner.

Further, in an embodiment of the present disclosure, six co-face neighbouring nodes of the current node are provided; twelve co-edge neighbouring nodes of the current node are provided; and eight co-corner neighbouring nodes of the current node are provided.

Figure 12:
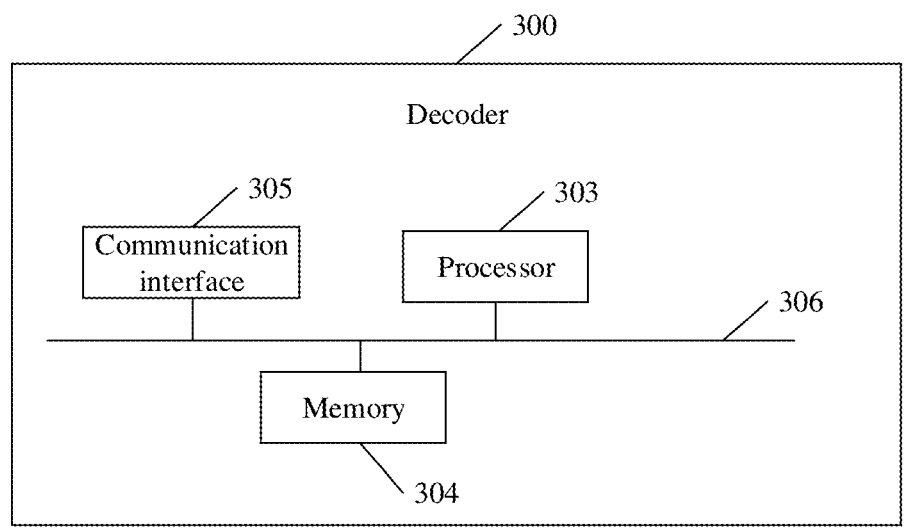
FIG. 12 is a second schematic diagram of the composition structure of a decoder.

FIG. 12 is a second schematic diagram of the composition structure of a decoder. As shown in FIG. 12, the decoder 300 proposed in an embodiment of the present disclosure includes a processor 303, a memory 304 storing instructions executable by the processor 303, a communication interface 305, and a bus 306 for connecting the processor 303, the memory 304, and the communication interface 305.

Further, in an embodiment of the present disclosure, the processor 303 described above is configured to: decode a bitstream, and determine a mode parameter; if the mode parameter indicates to use a spatial scalability mode, determine geometric center coordinates of a current node, and determine, in a point cloud, geometric center coordinates of neighbouring nodes of the current node based on the geometric center coordinates of the current mode; determine local spatial coordinate means corresponding to the current node based on the geometric center coordinates of the current node and the geometric center coordinates of the neighbouring nodes; and determine reconstructed geometric information of the current node based on the local spatial coordinate means.

It can be understood that, in an embodiment of the present disclosure, "unit" may be part of a circuit, part of a processor, part of a program or software, etc. Of course, it may also be a module, or may be non-modular. Moreover, various components in the present embodiment may be integrated in one processing unit, or each unit may be individually physically present, or two or more units may be integrated into one unit. The integrated units described above may be implemented in the form of hardware or in the form of software functional modules.

If the integrated units are implemented in the form of software functional modules and are not sold or used as an independent product, the integrated units may be stored in a computer-readable storage medium. On the basis of such understanding, the technical solution of the present embodiment essentially may be implemented in the form of a software product, or part of the technical solution that essentially contributes to the prior art, or all or part of the technical solution may be implemented in the form of a software product. The computer software product is stored in a storage medium, including several instructions causing a computer device (which may be a personal computer, a server, a network device or the like) or a processor to perform all or part of the operations of the method described in the present embodiment. The forgoing storage medium includes: a U disk, a mobile hard disk, a Read Only Memory (ROM), a Random Access Memory (RAM), a magnetic disk, an optical disk, or other media that can store program codes.

It can be understood that the memory in the embodiments of the present disclosure may be a volatile memory or a non-volatile memory, or may include both volatile and non-volatile memories. The non-volatile memory may be a Read-Only Memory (ROM), a programmable read-only memory (Programmable ROM, PROM), an erasable programmable read-only memory (Erasable PROM, EPROM), an electrically EPROM (Electrically EPROM, EEPROM), or a flash memory. The volatile memory may be Random Access Memory (RAM), which acts as an external cache. By way of illustrative but non-limiting example, many forms of RAMs are available, such as static random access memories (Static RAM, SRAM), dynamic random access memories (Dynamic RAM, DRAM), synchronous dynamic random access memories (Synchronous DRAM, SDRAM), double data rate synchronous dynamic random access memories (Double Data Rate SDRAM, DDRSDRAM), enhanced synchronous dynamic random access memories (Enhanced SDRAM, ESDRAM), synchronous link dynamic random access memories (Synchlink DRAM, SLDRAM), and direct memory bus random access memories (Direct Rambus RAM, DRRAM). The memory in the systems and methods described in the present disclosure is intended to include, but is not limited to, the foregoing and any other suitable type of memory.

The processor may be an integrated circuit chip with a signal processing capability. During implementation, each operation in the method described above may be completed by an integrated logic circuit of hardware in a processor or instructions in the form of software. The above processor may be a general-purpose processor, a Digital Signal Processor (DSP), an Application Specific Integrated Circuit (ASIC), a Field Programmable Gate Array (FPGA) or other programmable logic devices, a discrete gate or transistor logic device, or a discrete hardware component. The various methods, operations, and logical block diagrams disclosed in the embodiments of the present disclosure may be implemented or executed. The general-purpose processor may be a microprocessor, or the processor may also be any conventional processor, etc. Operations of the method disclosed in the embodiments of the present disclosure may be directly executed and completed by a hardware decoding processor, or executed and completed by a combination of hardware and software modules in the decoding processor. Software modules may be located in a mature storage medium in the art such as a random access memory, a flash memory, a read-only memory, a programmable read-only memory, an electrically erasable programmable memory, or a register. The storage medium is located in the memory, and the processor reads the information in the memory, and completes the operations of the above method in combination with its hardware.

It can be understood that these embodiments described in the present disclosure may be implemented with hardware, software, firmware, middleware, microcode, or a combination thereof. For hardware implementation, the processing unit may be implemented in one or more Application Specific Integrated circuits (ASIC), Digital Signal processors (DSP), Digital Signal Processing Devices (DSPD), Programmable Logic Devices (PLD), Field-Programmable Gate Arrays (FPGA), general purpose processors, controllers, microcontrollers, and microprocessors, other electronic units for performing the functions described in the present disclosure, or a combination thereof. For software implementation, the techniques described in the present disclosure may be implemented by modules (e.g., processes, functions, etc.) executing the functions described in the present disclosure. Software codes may be stored in a memory and executed by a processor. The memory may be implemented in or outside the processor.

An embodiment of the present disclosure provides a decoder. The decoder is configured to: decode a bitstream and determine a mode parameter; if the mode parameter indicates to use a spatial scalability mode, determine geometric center coordinates of a current node, and determines, in a point cloud, geometric center coordinates of neighbouring nodes of the current node based on the geometric center coordinates of the current mode; determine local spatial coordinate means corresponding to the current node based on the geometric center coordinates of the current node and the geometric center coordinates of the neighbouring nodes; and determine reconstructed geometric information of the current node based on the local spatial coordinate means. As can be seen, in the embodiments of the present disclosure, if the spatial scalability mode is used, the decoder may determine the local spatial coordinate means of the current node in a local space consisting of the current node and the neighbouring nodes based on the geometric center coordinates of the current node and the geometric center coordinates of the neighbouring nodes, and then perform geometric information reconstruction for the current node using the local spatial coordinate means, to determine the corresponding reconstructed geometric information. That is, in the point cloud decoding method proposed in the present disclosure, by taking into consideration different distributions of points inside different nodes in the point cloud, the coordinate means of the current node in the local space can be used to calculate the geometric information of the point cloud after spatial scalability-based encoding, so that the spatial correlation of the point cloud is fully utilized in the decoding process of the point cloud, thereby reducing the geometric error of geometric information reconstruction and improving decoding efficiency.

An embodiment of the present disclosure provides a non-transitory computer-readable storage medium, which is applied to an encoder 300. The non-transitory computer-readable storage medium stores a point cloud decoding program. When the point cloud decoding program is executed by a processor, the method described in any one of the preceding embodiments is implemented.

Specifically, program instructions corresponding to a point cloud decoding method in the present embodiments may be stored on a storage medium, such as an optical disk, a hard disk, a U disk, etc. When the program instructions corresponding to the point cloud decoding method in the storage medium are read or executed by an electronic device, the following operations are implemented:

decoding a bitstream, and determining a mode parameter;
when the mode parameter indicates to use a spatial scalability mode, determining geometric center coordinates of a current node, and determining, in a point cloud, geometric center coordinates of neighbouring nodes of the current node based on the geometric center coordinates of the current mode;
determining local spatial coordinate means corresponding to the current node based on the geometric center coordinates of the current node and the geometric center coordinates of the neighbouring nodes; and
determining reconstructed geometric information of the current node based on the local spatial coordinate means.

It should be noted that in the present disclosure, the terms "comprising," including," or any other variation thereof are intended to indicate non-exclusive inclusion, so that processes, methods, articles or devices including a series of elements not only include those elements, but also include other elements not explicitly listed, or elements inherent to such processes, methods, articles, or devices. In the absence of more limitations, an element defined by the statement "comprising a . . . " does not preclude the presence of additional same elements in a process, method, article or device that includes the element.

The above-mentioned serial numbers of the embodiments of the present disclosure are merely for the purpose of description and do not represent advantages or disadvantages of the embodiments.

The methods disclosed in several method embodiments provided by the present disclosure may be arbitrarily combined without conflict to obtain new method embodiments.

The features disclosed in several product embodiments provided by the present disclosure may be arbitrarily combined without conflict to obtain new product embodiments.

The features disclosed in several method or device embodiments provided by the present disclosure may be arbitrarily combined without conflict to obtain new method embodiments or device embodiments.

The detailed description of the present disclosure is described above, but the scope of protection of the present disclosure is not limited thereto. Any person skilled in the art could easily conceive of changes or substitutions within the technical scope disclosed in the present disclosure, and all of the changes or substitutions should be covered by the scope of protection of the present disclosure. Therefore, the scope of protection of the present disclosure should be defined by the scope of protection of the claims.

INDUSTRIAL APPLICABILITY

A point cloud decoding method, a decoder, and a non-transitory computer-readable storage medium are provided in the embodiments of the present disclosure. The decoder is configured to: decode a bitstream and determine a mode parameter; when the mode parameter indicates to use a spatial scalability mode, determine geometric center coordinates of a current node, and determines, in a point cloud, geometric center coordinates of neighbouring nodes of the current node based on the geometric center coordinates of the current mode; determine local spatial coordinate means corresponding to the current node based on the geometric center coordinates of the current node and the geometric center coordinates of the neighbouring nodes; and determine reconstructed geometric information of the current node based on the local spatial coordinate means. As can be seen, in the embodiments of the present disclosure, if the spatial scalability mode is used, the decoder may determine the local spatial coordinate means of the current node in a local space consisting of the current node and the neighbouring nodes based on the geometric center coordinates of the current node and the geometric center coordinates of the neighbouring nodes, and then perform geometric information reconstruction for the current node using the local spatial coordinate means, to determine the corresponding reconstructed geometric information. That is, in the point cloud decoding method proposed in the present disclosure, by taking into consideration different distributions of points inside different nodes in the point cloud, the coordinate means of the current node in the local space can be used to calculate the geometric information of the point cloud after spatial scalability-based encoding, so that the spatial correlation of the point cloud is fully utilized in the decoding process of the point cloud, thereby reducing the geometric error of geometric information reconstruction and improving decoding efficiency.

The invention claimed is:

1. A method for decoding a point cloud, performed by a decoder, the method comprising:
    decoding a bitstream, and determining a mode parameter;
    in response to the mode parameter indicating to use a spatial scalability mode, determining geometric center coordinates of a current node, and determining, in the point cloud, geometric center coordinates of neighbouring nodes of the current node based on the geometric center coordinates of the current node;
    determining local spatial coordinate means corresponding to the current node based on the geometric center coordinates of the current node and the geometric center coordinates of the neighbouring nodes; and determining reconstructed geometric information of the current node based on the local spatial coordinate means.

2. The method of claim 1, further comprising:
in response to the mode parameter indicating to use the spatial scalability mode, not decoding a skip layer where the current node is located.

3. The method of claim 1, further comprising:
in response to the mode parameter indicating that no spatial scalability mode is used, decoding a skip layer where the current node is located.

4. The method of claim 2, further comprising:
determining presence information identifiers of the neighbouring nodes.

5. The method of claim 4, wherein determining the local spatial coordinate means corresponding to the current node based on the geometric center coordinates of the current node and the geometric center coordinates of the neighbouring nodes comprises:
determining the local spatial coordinate means based on the geometric center coordinates of the current node, the geometric center coordinates of the neighbouring nodes, and the presence information identifiers.

6. The method of claim 4, wherein determining the presence information identifiers of the neighbouring nodes comprises:
in response to determining, based on an information stream, that the neighbouring nodes are not present, determining that the presence information identifiers have a first numerical value; and
in response to determining, based on the information stream, that the neighbouring nodes are present, determining that the presence information identifiers have a second numerical value.

7. The method of claim 5, wherein
the geometric center coordinates of the current node comprise a first coordinate value in a first spatial direction, a second coordinate value in a second spatial direction, and a third coordinate value in a third spatial direction; and
the geometric center coordinates of the neighbouring nodes comprise fourth coordinate values in the first spatial direction, fifth coordinate values in the second spatial direction, and sixth coordinate values in the third spatial direction.

8. The method of claim 7, wherein determining the local spatial coordinate means of the current node based on the geometric center coordinates of the current node, the geometric center coordinates of the neighbouring nodes, and the presence information identifiers comprises:
determining, from the neighbouring nodes, one or more target neighbouring nodes whose presence information valve identifiers have values of 1,
performing a weighted average on the fourth coordinate values of the one or more target neighbouring nodes and the first coordinate value, to obtain a numerical value of the local spatial coordinate means of the current node in the first spatial direction;
performing a weighted average on the fifth coordinate values of the one or more target neighbouring nodes and the second coordinate value, to obtain a numerical value of the local spatial coordinate means of the current node in the second spatial direction; and
performing a weighted average on the sixth coordinate values of the one or more target neighbouring nodes and the third coordinate value, to obtain a numerical value of the local spatial coordinate means of the current node in the third spatial direction.

9. The method of claim 8, wherein determining the reconstructed geometric information of the current node based on the local spatial coordinate means comprises:
performing a weighted average on the first coordinate value and the numerical value of the local spatial coordinate means in the first spatial direction, to obtain a numerical value of the reconstructed geometric information of the current node in the first spatial direction;
performing a weighted average on the second coordinate value and the numerical value of the local spatial coordinate means in the second spatial direction, to obtain a numerical value of the reconstructed geometric information of the current node in the second spatial direction; and
performing a weighted average on the third coordinate value and the numerical value of the local spatial coordinate means in the third spatial direction, to obtain a numerical value of the reconstructed geometric information of the current node in the third spatial direction.

10. The method of claim 1, wherein determining the geometric center coordinates of the current node comprises:
determining lower left front corner coordinates and an edge length parameter corresponding to the current node; and
determining the geometric center coordinates of the current node based on the lower left front corner coordinates and the edge length parameter.

11. The method of claim 1, wherein the neighbouring nodes comprise at least one of the following:
a co-face neighbouring node adjoining the current node by a face;
a co-edge neighbouring node adjoining the current node by an edge; or
a co-corner neighbouring node adjoining the current node by a corner.

12. The method of claim 11, wherein
six co-face neighbouring nodes of the current node are provided;
twelve co-edge neighbouring nodes of the current node are provided; and
eight co-corner neighbouring nodes of the current node are provided.

13. A decoder, comprising:
a processor; and
a memory storing instructions executable by the processor,
wherein the instructions, when executed by the processor, cause the processor to:
decode a bitstream, and determine a mode parameter;
in response to the mode parameter indicating to use a spatial scalability mode, determine geometric center coordinates of a current node, and determine, in a point cloud, geometric center coordinates of neighbouring nodes of the current node based on the geometric center coordinates of the current node;
determine local spatial coordinate means corresponding to the current node based on the geometric center coordinates of the current node and the geometric center coordinates of the neighbouring nodes; and
determine reconstructed geometric information of the current node based on the local spatial coordinate means.

14. The decoder of claim 13, wherein the instructions further cause the processor to:

in response to the mode parameter indicating to use the spatial scalability mode, not decode a skip layer where the current node is located.

15. The decoder of claim 14, wherein the instructions further cause the processor to determine presence information identifiers of the neighbouring nodes.

16. The decoder of claim 15, wherein the instructions further cause the processor to determine the local spatial coordinate means based on the geometric center coordinates of the current node, the geometric center coordinates of the neighbouring nodes, and the presence information identifiers.

17. The decoder of claim 15, wherein the instructions further cause the processor to:

in response to determining, based on an information stream, that the neighbouring nodes are not present, determine that the presence information identifiers have a first numerical value; and in response to determining, based on the information stream, that the neighbouring nodes are present, determine that the presence information identifiers have a second numerical value.

18. The decoder of claim 16, wherein the geometric center coordinates of the current node comprise a first coordinate value in a first spatial direction, a second coordinate value in a second spatial direction, and a third coordinate value in a third spatial direction; and the geometric center coordinates of the neighbouring nodes comprise fourth coordinate values in the first spatial direction, fifth coordinate values in the second spatial direction, and sixth coordinate values in the third spatial direction.

19. The decoder of claim 18, wherein the instructions further cause the processor to:

determine, from the neighbouring nodes, one or more target neighbouring nodes whose presence information identifiers have values of 1, perform a weighted average on the fourth coordinate values of the one or more target neighbouring nodes and the first coordinate value, to obtain a numerical value of the local spatial coordinate means of the current node in the first spatial direction;

perform a weighted average on the fifth coordinate values of the one or more target neighbouring nodes and the second coordinate value, to obtain a numerical value of the local spatial coordinate means of the current node in the second spatial direction; and perform a weighted average on the sixth coordinate values of the one or more target neighbouring nodes and the third coordinate value, to obtain a numerical value of the local spatial coordinate means of the current node in the third spatial direction.

20. A non-transitory computer-readable storage medium having stored therein a computer program that, when executed by a processor, causes the processor to perform operations comprising:

decoding a bitstream, and determining a mode parameter;

in response to the mode parameter indicating to use a spatial scalability mode, determining geometric center coordinates of a current node, and determining, in a point cloud, geometric center coordinates of neighbouring nodes of the current node based on the geometric center coordinates of the current node;

determining local spatial coordinate means corresponding to the current node based on the geometric center coordinates of the current node and the geometric center coordinates of the neighbouring nodes; and determining reconstructed geometric information of the current node based on the local spatial coordinate means.

* * * * *